US008863618B2

(12) United States Patent
Kubo et al.

(10) Patent No.: US 8,863,618 B2
(45) Date of Patent: Oct. 21, 2014

(54) DRIVING FORCE TRANSMISSION DEVICE FOR HYBRID VEHICLE

(75) Inventors: Katsumi Kubo, Wako (JP); Jirou Obinata, Wako (JP); Shinji Fujimoto, Wako (JP); Masaaki Tsuruoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 13/520,506

(22) PCT Filed: Dec. 22, 2010

(86) PCT No.: PCT/JP2010/073154
§ 371 (c)(1),
(2), (4) Date: Jul. 3, 2012

(87) PCT Pub. No.: WO2011/086828
PCT Pub. Date: Jul. 21, 2011

(65) Prior Publication Data
US 2012/0277060 A1  Nov. 1, 2012

(30) Foreign Application Priority Data
Jan. 12, 2010 (JP) ................... 2010-004469

(51) Int. Cl.
F16H 37/06 (2006.01)
B60K 25/02 (2006.01)
B60W 10/30 (2006.01)
F16H 57/04 (2010.01)
B60K 6/48 (2007.10)
F16H 3/00 (2006.01)

(52) U.S. Cl.
CPC . *B60K 6/48* (2013.01); *B60K 25/02* (2013.01); *F16H 3/003* (2013.01); *B60W 10/30* (2013.01); *F16H 57/0439* (2013.01); *Y02T 10/6221* (2013.01)
USPC ........................... 74/665 N; 74/661

(58) Field of Classification Search
USPC ................. 74/661, 665 L, 665 N
See application file for complete search history.

(56) References Cited

U.S. PATENT DOCUMENTS

| 6,491,602 B1 * | 12/2002 | Hohn | 477/5 |
| 6,722,230 B2 * | 4/2004 | Sakamoto et al. | 74/661 |
| 7,171,870 B1 * | 2/2007 | Giberson | 74/661 |
| 7,753,816 B2 * | 7/2010 | Chachra et al. | 475/5 |
| 8,028,526 B2 * | 10/2011 | Giberson | 60/646 |

FOREIGN PATENT DOCUMENTS

| JP | 2001-146955 A | 5/2001 |
| JP | 3211626 B2 | 9/2001 |

(Continued)

OTHER PUBLICATIONS

International Search Report for PCT/JP2010/073154, for mailing date Mar. 1, 2011.

*Primary Examiner* — Ha D Ho
(74) *Attorney, Agent, or Firm* — Westerman, Hattori, Daniels & Adrian, LLP

(57) ABSTRACT

A driving force transmission device for a hybrid vehicle is provided with a motor which drives a rotation shaft, and a connection/disconnection switching device which switches between connection and disconnection of driving force for driving wheels, the driving force being transmitted from an engine. The driving force transmission device is also provided with the auxiliary device driving mechanism, which includes one or more auxiliary device driving shafts for transmitting driving force to the in-vehicle accessory devices, one or more rotation transmission sections which transmit at least either engine's driving force or motor's driving force to one or more accessory device driving shafts via the rotation shaft, and a plurality of one-way clutches provided between the one or more rotation transmission sections and the one or more accessory device driving shafts.

9 Claims, 14 Drawing Sheets

(56) References Cited

FOREIGN PATENT DOCUMENTS

| | | | |
|---|---|---|---|
| JP | 2004-011819 A | 1/2004 | |
| JP | 2004-100725 A | 4/2004 | |
| JP | 2004-317811 A | 11/2004 | |
| JP | 3636981 B2 | 4/2005 | |
| JP | 4299068 B2 | 7/2009 | |

\* cited by examiner

DRIVING FORCE TRANSMISSION DEVICE FOR HYBRID VEHICLE

TECHNICAL FIELD

The present invention relates a driving force transmission device for use in hybrid vehicle, which operates to transmit a driving force of an engine or motor to driving wheels. More particularly, the invention relates to a driving force transmission device equipped with an auxiliary device driving mechanism for driving an in-vehicle auxiliary device, such as an oil pump, with the driving force of the engine or motor.

BACKGROUND ART

Heretofore, there have been known driving force transmission devices for hybrid vehicle which include a rotation shaft for transmitting a rotational driving force to the driving wheels, and the engine and motor for driving the rotation shaft. Some of the driving force transmission devices are equipped with the auxiliary device driving mechanism for driving the in-vehicle auxiliary device such as the oil pump with the driving force of the engine or motor.

As an example of the auxiliary device driving mechanism, a driving mechanism for vehicle oil pump is set forth in patent document 1. This driving mechanism includes a first power transmission path interconnecting an output shaft of the motor and a drive shaft of the oil pump, and a second power transmission path interconnecting an output shaft of the engine and the drive shaft of the oil pump. The first power transmission path is provided with a first one-way clutch permitting only power transmission from the motor to the oil pump while the second power transmission path is provided with a second one-way clutch permitting only power transmission from the engine to the oil pump. With the engine and the motor simultaneously driven, this structure is adapted to drive the oil pump by way of either one of the engine and the motor that provides the greater rotational driving force.

The driving mechanism for vehicle oil pump disclosed in the patent document 1 is applicable to a case where the engine and the motor are rotatable only in normal direction. Therefore, this mechanism has a problem that when a vehicle is at a stop with its engine turned off, both of the power sources, namely the engine and the motor, are shut down and hence, the vehicle cannot maintain a required hydraulic pressure. The problem dictates the need to provide the oil pump, such as an electric oil pump, that is driven by a separate driving unit. This may result in the increase in the number of components, costs and weight.

An arrangement in which the auxiliary devices are driven by a driving motor is set forth in patent document 2. However, the auxiliary device driving mechanism disclosed in the patent document 2 has the following problem. When the vehicle is at a stop, a clutch between a gearbox and the motor must be disengaged to permit the auxiliary device to be driven. To restart the vehicle, on the other hand, a procedure starting from the shut-down motor followed by engaging the clutch and activating the motor need be performed. This results in the occurrence of time lag, which may reduce the merchantability of the vehicle in terms of startability. Further in a case where the clutch is used as the mechanism for disconnecting the power transmission between the gearbox and the motor, high production costs result because the clutch and components of a control system thereof are necessary.

A drive mechanism for an oil pump having inputs from two systems of the engine and an electric motor is set forth in patent document 3. In order to allow the motor to operate in reverse rotation, this drive mechanism adopts an oil passage switching structure employing a reversible pump and a cross valve. However, this drive mechanism involves a fear of complicated vehicle structure and increased weight and cost because the reversible pump and the associated electric devices are added to make the oil passage structure more complicated. Furthermore, the reversible pump has a lower efficiency than a one-way pump and thence may result in reduced fuel economy. Therefore, this drive mechanism is not adequate to improve the energy efficiency of the vehicle.

CITATION LIST

Patent Documents

[Patent Document 1]
JP-B-3636981
[Patent Document 2]
JP-B-3211626
[Patent Document 3]
JP-B-4299068

DISCLOSURE OF THE INVENTION

Problem to be Solved by the Invention

In view of the above-described problems, the invention has an object to provide a driving force transmission device for hybrid vehicle which device is equipped with an auxiliary device driving mechanism that has a simple structure reduced in the number of components and yet is capable of driving the in-vehicle auxiliary device, such as the oil pump, into unidirectional rotation by utilizing not only the rotation of the engine but also both the normal and reverse rotations of the motor.

Means for Solving the Problem

According to the invention for achieving the above object, a driving force transmission device (1) for hybrid vehicle which includes: an engine (2); a rotation shaft (3) for transmitting a rotational driving force to driving wheels (6); a motor (4) for driving the rotation shaft (3); and a connection/disconnection switching device (5) for switching between connection and disconnection of the driving force from the engine (2) to the driving wheels (6), further includes an auxiliary device driving mechanism (10) including: one or more auxiliary device driving shafts (11, 12) for transmitting the driving force to an in-vehicle auxiliary device (17, 18); one or more rotation transmission sections (21, 22) for transmitting at least either one of the driving force of the engine (2) and the driving force of the motor (4) to the one or more auxiliary device driving shafts (11, 12) via the rotation shaft (3); and a plurality of one-way clutches (26, 27, 33) disposed between the one or more rotation transmission sections (21, 22) and the one or more auxiliary device driving shafts (11, 12), wherein the auxiliary device driving shaft (11, 12) is configured to rotate unidirectionally in both cases where the rotation shaft (3) is rotated in the normal direction by the rotation of the engine (2) or the normal rotation of the motor (4) and where the rotation shaft (3) is rotated in the reverse rotation by the reverse rotation of the motor (4).

The driving force transmission device for hybrid vehicle according to the invention is adapted to rotate the auxiliary device driving shaft unidirectionally regardless of the rotational direction of the rotation shaft. This permits the in-vehicle auxiliary device to be driven into unidirectional rotation by not only the rotation of the engine but also both the normal and reverse rotations of the motor. Therefore, even in a case where the in-vehicle auxiliary device is a device which has directionality of rotation or is drivable only by unidirectional rotation, this device can be driven by the rotation of the engine and both the normal and reverse rotations of the motor. Accordingly, the in-vehicle auxiliary device and the auxiliary device driving mechanism can be made in simple structures.

That is, this auxiliary device driving mechanism is adapted to drive the in-vehicle auxiliary device such as the oil pump with the reverse rotation of the motor when the vehicle is at a stop. This obviates the need for providing the additional reversible pump and its associated electric devices or making the oil passage structure more complicated. Hence, the vehicle structure can be simplified and the reduction of weight and costs can be achieved. This auxiliary device driving mechanism can accomplish drastic simplification of a mechanism for switching driving force transmission paths, which includes the clutch and a control mechanism thereof. What is more, omission of the switching mechanism obviates the need for a cumbersome operation of switching the driving force transmission paths in conjunction with switching between the normal rotation and the reverse rotation of the motor. This results in reduced time elapsed between stop and start of the vehicle.

Further, this auxiliary device driving mechanism embodies a mechanism which can utilize both the normal rotation and the reverse rotation of the motor to drive the in-vehicle auxiliary device into the unidirectional rotation via the plurality of one-way clutches disposed between the one or more rotation transmission sections and the one or more auxiliary device driving shafts. Thus is provided a simple structure reduced in the number of components which is adapted to drive the in-vehicle auxiliary device having the directionality of rotation by utilizing both the normal and reverse rotations of the motor.

The auxiliary device driving mechanism (10) of the driving force transmission device for hybrid vehicle according to the invention may include at least: first and second auxiliary device driving shafts (11, 12); a first rotation transmission section (21) for transmitting the rotation of the rotation shaft (3) to the first and second auxiliary device driving shafts (11, 12); a first one-way clutch (26) for transmitting only the normal rotation of the rotation shaft (3) from the first rotation transmission section (21) to the first auxiliary device driving shaft (11); a second one-way clutch (27) for transmitting only the reverse rotation of the rotation shaft (3) from the first rotation transmission section (21) to the second auxiliary device driving shaft (12); and an external gear set (35) including a gear (35a) fixed to the first auxiliary device driving shaft (11) and a gear (35b) fixed to the second auxiliary device driving shaft (12), the gears meshing with each other.

The above-described structure is designed such that because of the action of the first and second one-way clutches, the first auxiliary device driving shaft is driven into the normal rotation when the motor rotates in the normal direction and the second auxiliary device driving shaft is driven into the reverse rotation when the motor rotates in the reverse direction. The external gear set disposed between the first auxiliary device driving shaft and the second auxiliary device driving shaft operates to reverse the rotation of either one of the first and second auxiliary device driving shafts and to transmit the reversed rotation to the other driving shaft. Because of the action of these components, the first and second auxiliary device driving shafts are each made to rotate unidirectionally whether the motor rotates in the normal direction or the reverse direction.

The auxiliary device driving mechanism (10) having the above-described structure may further include: a second rotation transmission section (22) for transmitting the rotation of the rotation shaft (3) to the first auxiliary device driving shaft (11); and a third one-cay clutch (33) for transmitting only the normal rotation of the rotation shaft (3) from the second rotation transmission section (22) to the first auxiliary device driving shaft (11).

An embodiment of the auxiliary device driving mechanism (10) having the above-described structure may be arranged such that the first rotation transmission section (21) includes: a driving sprocket (23) mounted on the rotation shaft (3); a first driven sprocket (24) mounted on the first auxiliary device driving shaft (11); a second driven sprocket (25) mounted on the second auxiliary device driving shaft (12); and a chain (28) looped around the driving sprocket (23), the first driven sprocket (24) and the second driven sprocket (25), and that the second rotation transmission section (22) includes: another driving sprocket (31) mounted on the rotation shaft (3); another driven sprocket (32) mounted on the first auxiliary device driving shaft (11); and a chain (34) looped around these driving sprocket (31) and driven sprocket (32). This structure employs the chain drive mechanisms as the first and second rotation transmission mechanisms thereby obviating the need for belt tension adjustment and belt replacement which are necessary jobs in a belt-driven mechanism. Thus is provided a maintenance-free mechanism.

In this case, the external gear set (35) may be replaced by an external-gear oil pump (9) as the in-vehicle auxiliary device, the oil pump including pump gears (9a, 9b) which are fixed to the first and second auxiliary device driving shafts (11, 12), respectively, and meshed with each other. If the external-gear oil pump replaces the external gear set, the oil pump is adapted to function as an external gear set which is disposed between the first and second auxiliary device driving shafts for converting the rotational directions of the shafts. Hence, the auxiliary device driving mechanism can be reduced in the number of components, achieving structure simplification and cost reduction. Furthermore, the auxiliary device driving mechanism and the in-vehicle auxiliary device contribute to space saving.

The driving force transmission device having the above-described structure may be configured to rotate at least either one of the first and second auxiliary device driving shafts (11, 12) at desired number of revolutions and torque by setting a predetermined relation between the teeth numbers of the sprockets (23, 24, 25, 31, 32) of the first and second rotation transmission sections (21, 22) and the teeth numbers of the gears (35a, 35b, 9a, 9b) of the external gear set (35) or the external-gear oil pump (9). This structure is adapted to drive the in-vehicle auxiliary device at proper number of revolutions and torque.

It is noted that the above characters in parentheses represent, by way of example, reference characters of components of embodiments to be described hereinafter.

Effects of the Invention

The driving force transmission device for hybrid vehicle according to the invention features the simple structure having a reduced number of components which is adapted to rotate the in-vehicle auxiliary device such as the oil pump with not only the rotation of the engine but also with both the normal and reverse rotations of the motor.

EMBODIMENT OF THE INVENTION

The embodiment of the invention will be described in detail as below with reference to the accompanying drawings.

First Embodiment

Figure 1:
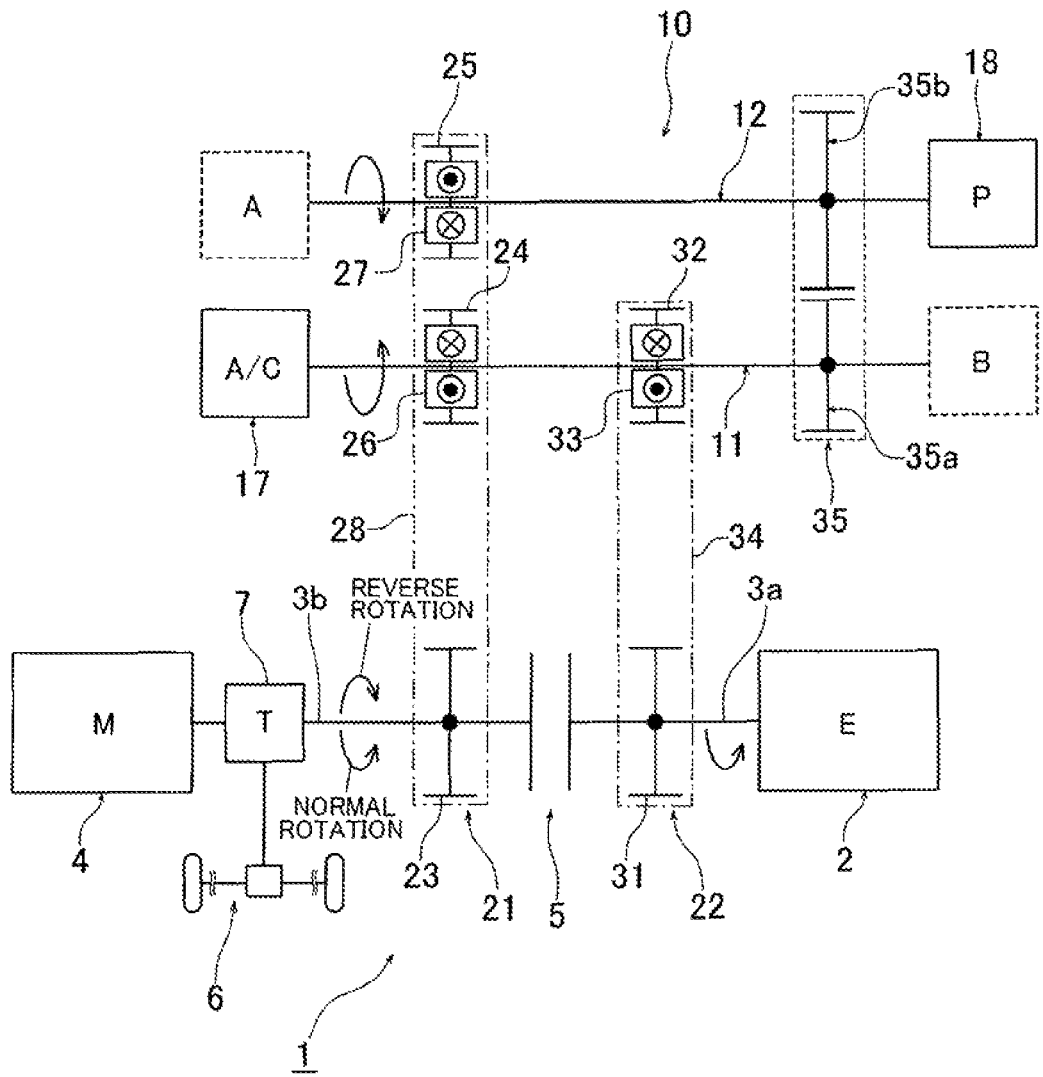
FIG. 1 is a skeleton diagram schematically showing a driving force transmission device for hybrid vehicle according to a first embodiment of the invention.

FIG. 1 is a skeleton diagram schematically showing a driving force transmission device for hybrid vehicle according to a first embodiment of the invention. The driving force transmission device 1 shown in the figure includes: an engine 2; an input shaft 3 (3a, 3b) for transmitting a rotational driving force to driving wheels 6 via a gearshift mechanism 7; a motor (vehicle traction motor) 4 for driving the input shaft 3; and a clutch (connection/disconnection switching device) 5 for switching between connection and disconnection of the driving force supplied from the engine 2 to the driving wheels 6 by means of the input shaft 3. The driving force transmission device 1 further includes an auxiliary device driving mechanism 10 for transmitting the driving force to an air compressor 17 or an oil pump (negative pressure pump) 18 as an in-vehicle auxiliary device. The auxiliary device driving mechanism 10 includes: first and second auxiliary device driving shafts 11, 12; first and second rotation transmission sections 21, 22 for transmitting at least either one of the driving force of the engine 2 and the driving force of the motor 4 to the first and second auxiliary device driving shafts 11, 12 via the input shaft 3; and three one-way clutches 26, 27, 33 disposed between the first and second rotation transmission sections 21, 22 and the first and second auxiliary device driving shafts 11, 12. Hereinafter, the term "normal rotation direction" means a direction in which the shafts such as the input shaft 3 and the first and second auxiliary device driving shafts 11, 12 rotate clockwise, and the term "reverse rotation direction" means a direction in which the shafts rotate counterclockwise.

The input shaft 3 of the driving force transmission device 1 consists of an engine shaft 3a rotated by the driving force of the engine 2 and a motor shaft 3b coupled to the motor 4. These engine shaft 3a and motor shaft 3b are coaxially juxtaposed to each other. The clutch 5 for switching between the connection and disconnection of the driving force from the engine 2 to the driving wheels 6 is disposed between the engine shaft 3a and the motor shaft 3b.

The first auxiliary device driving shaft 11 and the second auxiliary device driving shaft 12 are spaced a given distance apart from each other and laid in parallel to the engine shaft 3a and the motor shaft 3b. The in-vehicle auxiliary devices driven by the first auxiliary device driving shaft 11 and the second auxiliary device driving shaft 12 include the air compressor 17 mounted to one end of the first auxiliary device driving shaft 11 and the oil pump 18 mounted to one end of the second auxiliary device driving shaft 12. The air compressor 17 is an auxiliary device which does not perform a reversible rotation function and thence, is drivable only by the normal rotation of the first auxiliary device driving shaft 11. Likewise, the oil pump 18 is also an auxiliary device which does not perform the reversible rotation function and thence, is drivable only by the reverse rotation of the second auxiliary device driving shaft 12. It is noted that other in-vehicle auxiliary devices drivable by the normal rotation of the first auxiliary device driving shaft 11 or by the reverse rotation of the second auxiliary device driving shaft 12 can be mounted to a portion represented by a reference character 'B' at the other end of the first auxiliary device driving shaft 11 and to a portion represented by a reference character 'A' at the other end of the second auxiliary device driving shaft 12, respectively.

The first rotation transmission section 21 disposed between the motor shaft 3b and the first and second auxiliary device driving shafts 11, 12 includes: a driving sprocket 23 mounted on the motor shaft 3b in a manner incapable of relative rotation; a first driven sprocket 24 mounted on the first auxiliary device driving shaft 11; and a second driven sprocket 25 mounted on the second auxiliary device driving shaft 12. A driving force transmission chain (triple-row chain) 28 is looped around the driving sprocket 23, the first driven sprocket 24 and the second driven sprocket 25. This chain 28 serves to transmit the rotation of the driving sprocket 23 on the motor shaft 3b to the first driven sprocket 24 on the first auxiliary device driving shaft 11 and the second driven sprocket 25 on the second auxiliary device driving shaft 12.

The one-way clutch for normal rotation transmission 26 is interposed between the first auxiliary device driving shaft 11 and the first driven sprocket 24. The one-way clutch for normal rotation transmission 26 is a mechanism which permits only the reverse rotation (idle rotation) of the first driven sprocket 24 relative to the first auxiliary device driving shaft 11 and which inhibits the relative rotation of the first driven sprocket 24 to the first auxiliary device driving shaft 11 in a case where the first driven sprocket 24 is rotated in the normal direction. On the other hand, the one-way clutch for reverse rotation transmission 27 is interposed between the second auxiliary device driving shaft 12 and the second driven sprocket 25. The one-way clutch for reverse rotation transmission 27 is a mechanism which permits only the normal rotation (idle rotation) of the second driven sprocket 25 relative to the second auxiliary device driving shaft 12 and which inhibits the relative rotation of the second driven sprocket 25 to the second auxiliary device driving shaft 12 in a case where the second driven sprocket 25 is rotated in the reverse direction.

Therefore, in a case where the motor shaft 3b and the driving sprocket 23 rotate in the normal direction, the relative rotation between the first driven sprocket 24 and the first auxiliary device driving shaft 11 is inhibited by the one-way clutch for normal rotation transmission 26 so that the rotation of the motor shaft 3b and the driving sprocket 23 is transmitted to the first auxiliary device driving shaft 11 via the first driven sprocket 24. In this case, on the other hand, the one-way clutch for reverse rotation transmission 27 permits the relative rotation (idle rotation) between the second driven sprocket 25 and the second auxiliary device driving shaft 23 and hence, the rotation of the motor shaft 3b and the driving sprocket 23 is not transmitted to the second auxiliary device driving shaft 12.

In a case where the motor shaft 3b and the driving sprocket 23 rotate in the reverse direction, on the other hand, the relative rotation between the second driven sprocket 25 and the second auxiliary device driving shaft 12 is inhibited by the one-way clutch for reverse rotation transmission 27 so that the rotation of the motor shaft 3b and the driving sprocket 23 is transmitted to the second auxiliary device driving shaft 12 via the second driven sprocket 25. In this case, the relative rotation (idle rotation) between the first driven sprocket 24 and the first auxiliary device driving shaft 11 is permitted by the one-way clutch for normal rotation transmission 26 and hence, the rotation of the motor shaft 3b and the driving sprocket 23 is not transmitted to the first auxiliary device driving shaft 11.

The second rotation transmission section 22 disposed between the engine shaft 3a and the first auxiliary device driving shaft 11 includes: a driving sprocket 31 mounted on the engine shaft 3a in a manner incapable of relative rotation; and a driven sprocket 32 mounted on the first auxiliary device driving shaft 11. A driving force transmission chain (double-row chain) 34 is looped around the driving sprocket 31 on the engine shaft 3a and the driven sprocket 32 on the first auxiliary device driving shaft 11. This chain 34 serves to transmit the rotation of the driving sprocket 31 on the engine shaft 3a to the driven sprocket 32 on the first auxiliary device driving shaft 11.

The one-way clutch for normal rotation transmission 33 is interposed between the driven sprocket 32 and the first auxiliary device driving shaft 11. The one-way clutch for normal rotation transmission 33 is a mechanism which permits only the reverse rotation (idle rotation) of the driven sprocket 32 relative to the first auxiliary device driving shaft 11 and which inhibits the relative rotation of the driven sprocket 32 to the first auxiliary device driving shaft 11 in a case where the driven sprocket 32 is rotated in the normal direction.

Therefore, in a case where the engine shaft 3a and the driving sprocket 31 rotate in the normal direction, the relative rotation between the driven sprocket 32 and the first auxiliary device driving shaft 11 is inhibited by the one-way clutch for normal rotation transmission 33 so that the rotation of the engine shaft 3a and the driving sprocket 31 is transmitted to the first auxiliary device driving shaft 11 via the driven sprocket 32. On the other hand, in a case where the motor 4, with the clutch 5 connected therewith, makes the reverse rotation to rotate the driving sprocket 31 in the reverse direction, the one-way clutch for normal rotation transmission 33 permits the relative rotation (idle rotation) between the driven sprocket 32 and the first auxiliary device driving shaft 11 and hence, the rotation of the driving sprocket 31 is not transmitted to the first auxiliary device driving shaft 11.

An external gear set 35 is disposed between the first auxiliary device driving shaft 11 and the second auxiliary device driving shaft 12. The external gear set 35 has a structure in which a first gear 35a and a second gear 35b are meshed with each other and in which the first gear 35a is mounted on the first auxiliary device driving shaft 11 in a manner incapable of relative rotation and the second gear 35b is mounted on the second auxiliary device driving shaft 12 in a manner incapable of relative rotation. The rotation of either one of the first auxiliary device driving shaft 11 and the second auxiliary device driving shaft 12 is reversed and transmitted to the other driving shaft by means of the external gear set 35. That is, the external gear set 35 functions as a rotational direction converting element and a power transmission element between the first auxiliary device driving shaft 11 and the second auxiliary device driving shaft 12.

Figure 2:
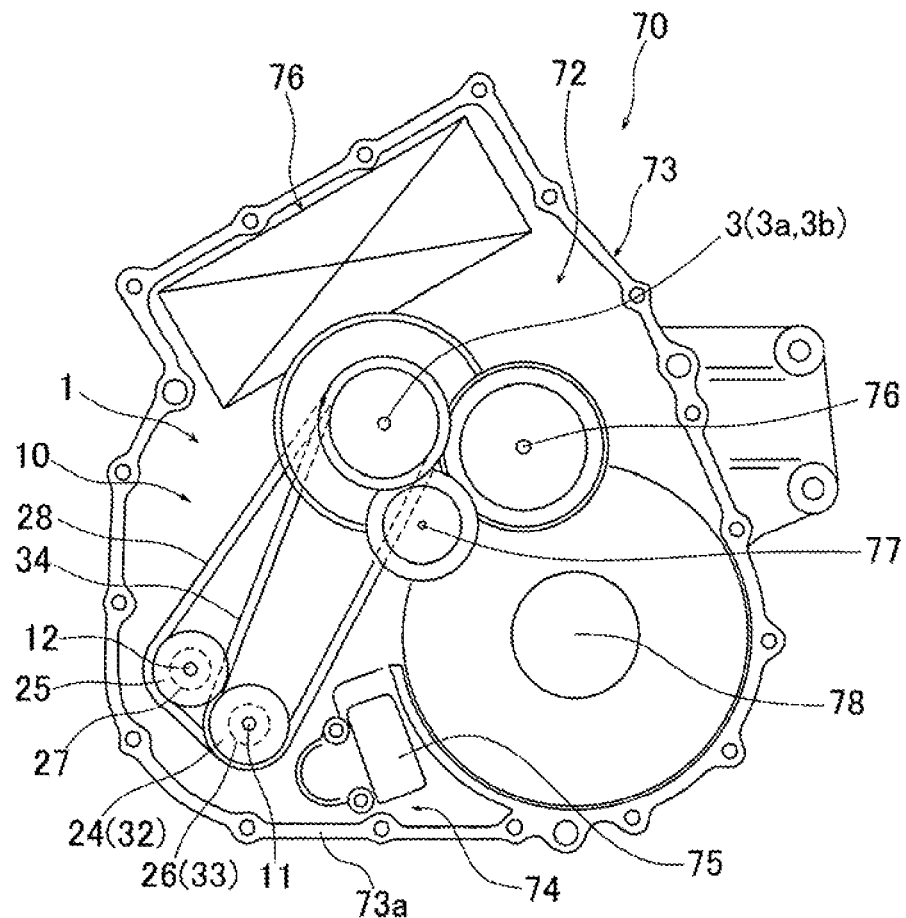
FIG. 2 is a diagram showing an internal configuration of a gearbox of the driving force transmission device according to the first embodiment.

FIG. 2 is a schematic sectional side view showing a gearbox 70 including the driving force transmission device 1 having the above structure. A configuration of the driving force transmission device 1 in the gearbox 70 is described with reference to the figure. The gearbox 70 includes a gear mechanism 72 and a casing 73 accommodating the gear mechanism 72 therein, the gear mechanism 72 including: the input shafts 3 (the engine shaft 3a and the motor shaft 3b), a first output shaft 76, a second output shaft 77 and a differential shaft 78 which are disposed in mutually parallel relation, and rotational parts rotatably disposed around these shafts 3, 76, 77, 78. A transmission control unit 76 is disposed laterally (on the left side as seen in the figure) of the gear mechanism 72 in the casing 73. The transmission control unit 76 includes mechanisms such as a hydraulic control valve for driving a shift fork (not shown) for forming a gearshift. A bottom (upper side of a bottom wall 73a) of the casing 73 defines an oil pool 74 which allows a lubricating oil to collect. In the casing 73, an oil strainer 75 is disposed in the vicinity of the bottom wall 73a.

The first auxiliary device driving shaft 11 and the second auxiliary device driving shaft 12 of the auxiliary device driving mechanism 10 are disposed in the casing 73 and diagonally downward from the input shaft 3. Namely, the first and second auxiliary device driving shafts 11, 12 are arranged side by side in the vicinity of the bottom wall 73a of the casing 73. Therefore, the double-row chain 34 looped around the rotation shaft 3 and the first auxiliary device driving shaft 11, and the triple-row chain 28 looped around the rotation shaft 3 and the first and second auxiliary device driving shafts 11, 12 are both extended diagonally downward from the input shaft 3 in the casing 73. Although not shown in FIG. 2, the air compressor 17 or the oil pump 18 as the in-vehicle auxiliary device is mounted to an axial end (far end or near end as seen on the drawing surface of FIG. 2) of the first auxiliary device driving shaft 11 or the second auxiliary device driving shaft 12.

Figures 3A, 3B:
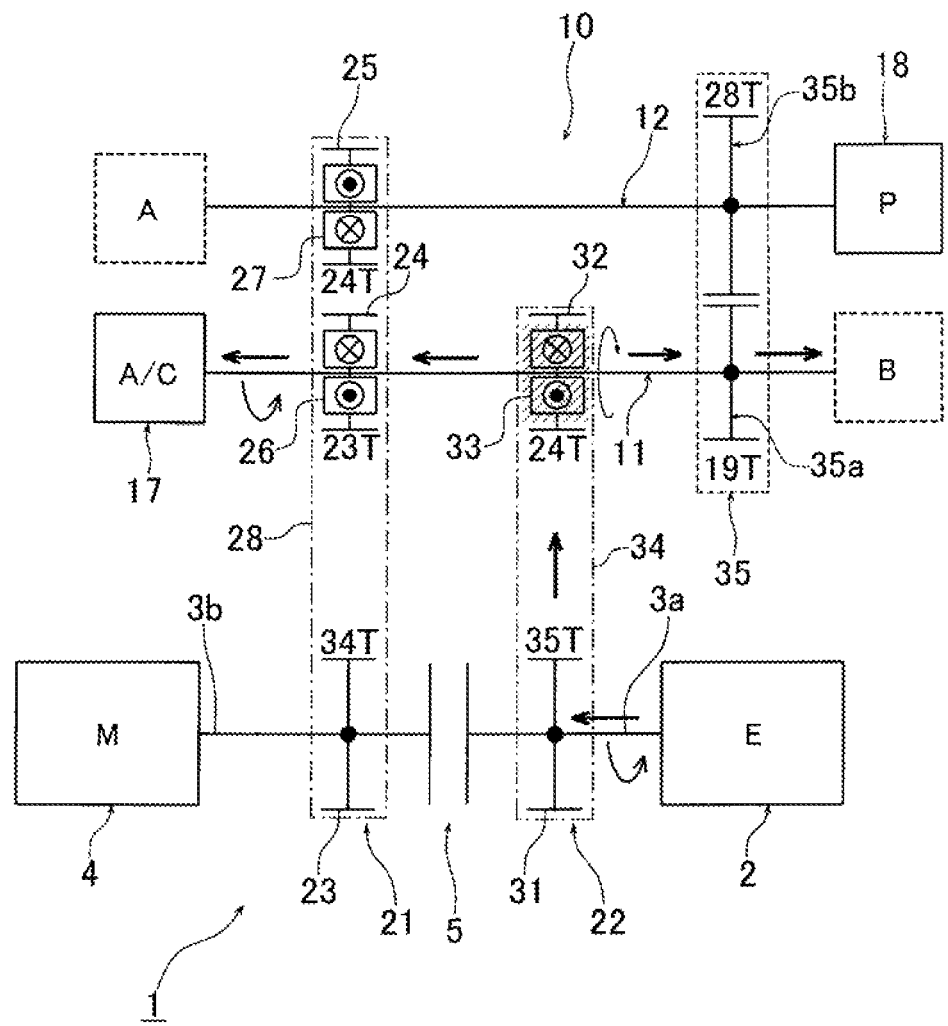
FIG. 3 diagrammatically illustrates how a driving force of an engine is transmitted to in-vehicle auxiliary device, and includes a skeleton diagram of FIG. 3A showing a driving force transmission path and a chart of FIG. 3B showing vehicle's running state (run/stop) and engine's state (on/off)

Next, description is made on the operation of the auxiliary device driving mechanism 10. FIG. 3 to FIG. 5 are diagrams for illustrating the operation of the auxiliary device driving mechanism 10. It is noted that the gearbox T and the driving wheels 6 are not shown in the skeleton diagrams from FIG. 3 onward. FIG. 3 diagrammatically illustrates how the driving force of the engine 2 is transmitted to the first auxiliary device driving shaft 11 and the second auxiliary device driving shaft 12. FIG. 3A is a skeleton diagram schematically showing a driving force transmission path. FIG. 3B is a chart showing a running state (run/stop) of the vehicle and a state (on/off) of the engine 2. FIG. 3A also shows an example of teeth number settings for the respective sprockets 23, 24, 25, 31, 32 and the gears 35a, 35b. In a state (idling state) where the vehicle is at a stop with the engine 2 'on' as shown in FIG. 3B, the driving force of the engine 2 rotates the engine shaft 3a in the normal direction. In this case, the driving sprocket 31 is rotated in the normal direction by the rotation of the engine shaft 3a. Thus, the rotation of the driving sprocket 31 is transmitted to the driven sprocket 32 via the chain 34 so that the driven sprocket 32 is rotated in the normal direction. Accordingly, the rotation of the driven sprocket 32 is transmitted to the first auxiliary device driving shaft 11 by means of the one-way clutch for normal rotation transmission 33, so that the first auxiliary device driving shaft 11 is rotated in the normal direction. Thus is driven the air compressor 17 mounted on the first auxiliary device driving shaft 11. Furthermore, the external gear set 35 reverses the rotation of the first auxiliary device driving shaft 11 and transmits the reversed rotation to the second auxiliary device driving shaft 12. Thus, the second auxiliary device driving shaft 12 is rotated in the reverse direction, thus driving the oil pump 18 mounted thereon.

Figures 4A, 4B:
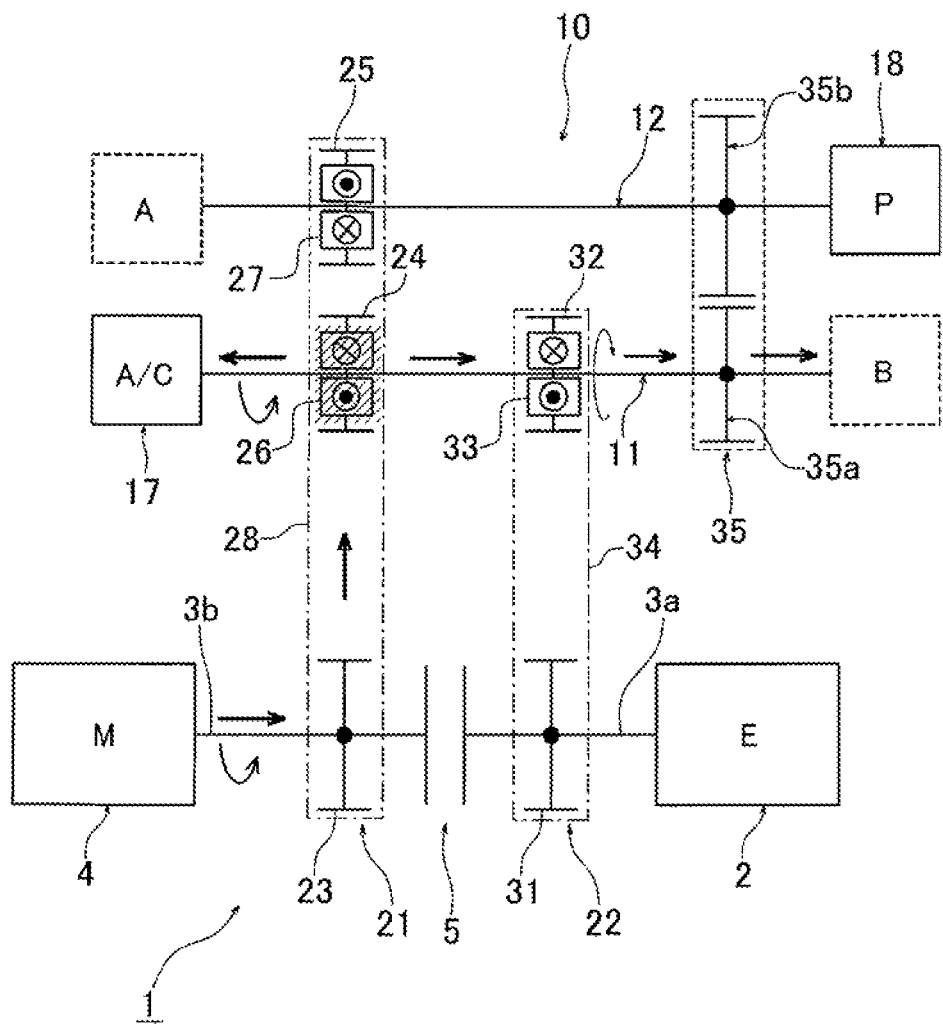
FIG. 4 diagrammatically illustrates how a driving force of a motor in normal rotation is transmitted to the in-vehicle auxiliary device, and includes a skeleton diagram of FIG. 4A showing a driving force transmission path and a chart of FIG. 4B showing vehicle's running state and engine's state.

FIG. 4 diagrammatically illustrates how the driving force derived by the normal rotation of the motor 4 is transmitted to the first auxiliary device driving shaft 11 and the second auxiliary device driving shaft 12. FIG. 4A is a skeleton diagram showing a driving force transmission path. FIG. 4B is a chart showing a running state (run/stop) of the vehicle and a state (on/off) of the engine 2. In a state where the vehicle is running with the engine 2 'on' or 'off' as shown in FIG. 4B, both the driving force of the engine 2 and the driving force of the motor 4 or only the driving force of the motor 4 is transmitted to the driving wheels 6 via the motor shaft 3b. In this case, the driving sprocket 23 is rotated in the normal direction by the normal rotation of the motor 4. Accordingly, the rotation of the driving sprocket 23 is transmitted to the first driven sprocket 24 on the first auxiliary device driving shaft 11 so that the first driven sprocket 24 is rotated in the normal direction. Then, the rotation of the first driven sprocket 24 is transmitted to the first auxiliary device driving shaft 11 by means of the one-way clutch for normal rotation transmission 26 so that the first auxiliary device driving shaft 11 is rotated in the normal direction. Thus is driven the air compressor 17 mounted to the first auxiliary device driving shaft 11. Further, the external gear set 35 reverses the rotation of the first auxiliary device driving shaft 11 and transmits the reversed rotation to the second auxiliary device driving shaft 12. Thus, the second auxiliary device driving shaft 12 is rotated in the reverse direction and hence, the oil pump 18 mounted thereon is driven. At this time, the second driven sprocket 25 on the second auxiliary device driving shaft 12 rotates in the normal direction. However, the one-way clutch for reverse rotation transmission 27 makes the idle rotation so that the rotation of the second driven sprocket 25 is not transmitted to the second auxiliary device driving shaft 12.

Figures 5A, 5B:
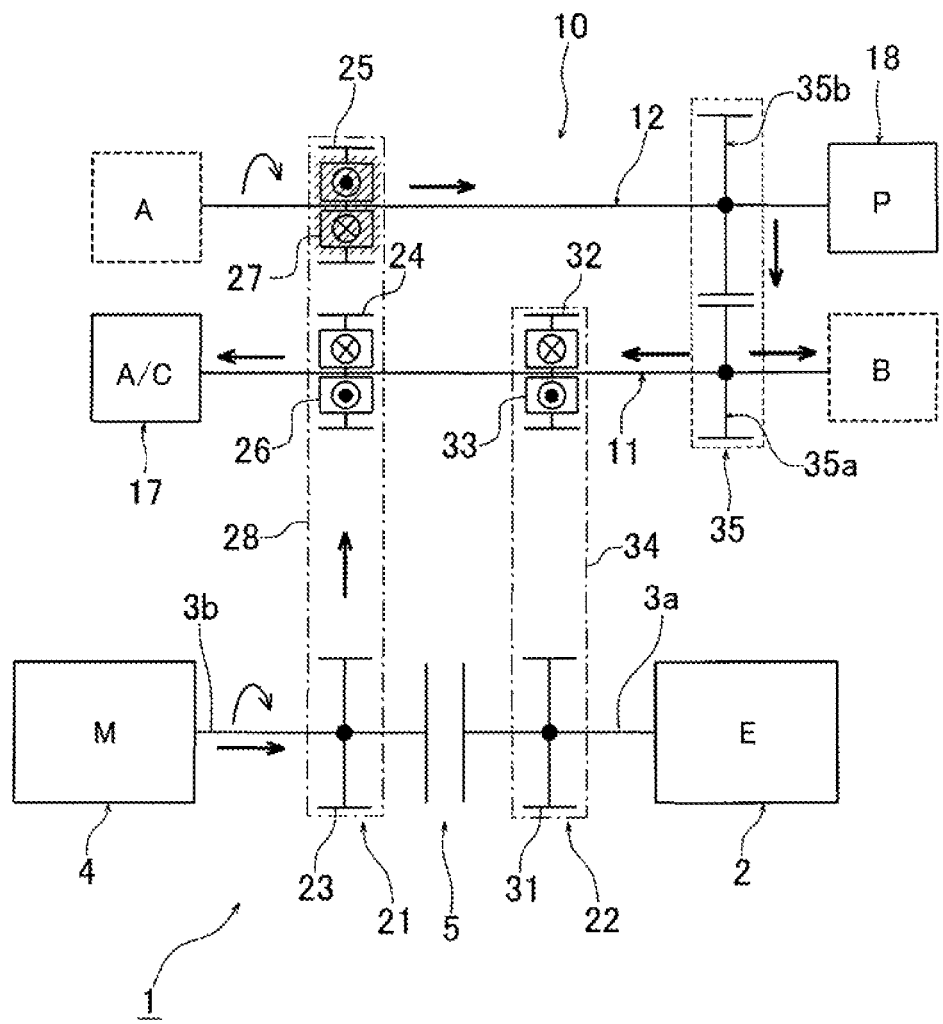
FIG. 5 diagrammatically illustrates how a driving force of the motor in reverse rotation is transmitted to the in-vehicle auxiliary device, and includes a skeleton diagram of FIG. 5A showing a driving force transmission path and a chart of FIG. 5B showing vehicle's running state and engine's state.

FIG. 5 diagrammatically illustrates how the driving force derived by the reverse rotation of the motor 4 is transmitted to the first auxiliary device driving shaft 11 and the second auxiliary device driving shaft 12. FIG. 5A is a skeleton diagram showing a driving force transmission path. FIG. 5B is a chart showing a running state (run/stop) of the vehicle and a state (on/off) of the engine 2. In a state where the vehicle is at a stop with the engine 2 being 'off' as shown in FIG. 5B, the rotation of the motor shaft 3b alone is permitted by disengaging the clutch 5. If, in this state, the motor 4 rotates in the reverse direction, as shown in FIG. 5A, the rotation of the motor brings the driving sprocket 23 into the reverse rotation. Thus, the rotation of the driving sprocket 23 is transmitted to the second driven sprocket 25 on the second auxiliary device driving shaft 12 via the chain 28, so that the second driven sprocket 25 is rotated in the reverse direction. Then, the one-way clutch for reverse rotation transmission 27 transmits the rotation of the second driven sprocket 25 to the second auxiliary device driving shaft 12, which is rotated in the reverse direction. Thus is driven the oil pump 18 mounted to the second auxiliary device driving shaft 12. Further, the external gear set 35 reverses the rotation of the second auxiliary device driving shaft 12 and transmits the reversed rotation to the first auxiliary device driving shaft 11. Thus, the first auxiliary device driving shaft 11 is rotated in the normal rotation, driving the air compressor 17 mounted thereon. At this time, the first driven sprocket 24 on the first auxiliary device driving shaft 11 is rotated in the reverse direction. However, the one-way clutch for normal rotation transmission 26 makes the idle rotation so that the rotation of the first driven sprocket 24 is not transmitted to the first auxiliary device driving shaft 11.

As described above, the auxiliary device driving mechanism 10 of the driving force transmission device 1 according to the embodiment is adapted to rotate the first and second auxiliary device driving shafts 11, 12 unidirectionally regardless of the rotational direction of the input shaft 3 (motor shaft 3b) driven by the engine 2 or the motor 4. Therefore, even in a case where the air compressor 17 and the oil pump 18 are auxiliary devices having directionality of rotation or drivable only by unidirectional rotation, the driving mechanism is capable of driving these devices with both the normal and reverse rotations of the motor 4. The driving mechanism obviates the need for employing expensive devices such as an electric oil pump or a pump capable of reversible operations, contributing to the cost reduction. Furthermore, the driving mechanism permits the in-vehicle auxiliary devices to be driven only by the vehicle traction motor 4 of the vehicle, thus obviating the need for a mechanism such as a motor for driving the auxiliary device. Therefore, the number of components of the gearbox and its peripherals can be reduced to accomplish the structure simplification.

The auxiliary device driving mechanism 10 of the embodiment embodies a mechanism which utilizes both the normal and reverse rotations of the motor 4 to drive the air compressor 17 or the oil pump 18 into the unidirectional rotation by means of the three one-way clutches 26, 27, 33 disposed between the first and second rotation transmission sections 21, 22 and the first and second auxiliary device driving shafts 11, 12. Thus is provided the simple structure having the reduced number of components, which is adapted to drive the in-vehicle auxiliary device having the directionality of rotation by utilizing both the normal and reverse rotations of the motor 4.

While the vehicle is at a stop, the auxiliary device driving mechanism 10 of the embodiment is adapted to drive the air compressor 17 or the oil pump 18 by utilizing the reverse rotation of the motor 4. This obviates the need for providing an additional reversible pump and its associated electric devices or making the oil passage structure more complicated. Hence, the vehicle structure can be simplified, and the reduction of vehicle body weight and cost can be achieved. Further, the auxiliary device driving mechanism can accomplish the omission or drastic simplification of a mechanism for switching the driving force transmission paths, which includes the clutches and the control mechanism thereof. What is more, the omission of the switching mechanism obviates the need for a cumbersome operation of switching the driving force transmission paths in conjunction with switching between the normal and reverse rotations of the motor 4. Hence, time elapsed between stop and start of the vehicle can be reduced. This results in improved merchantability of the vehicle in terms of startability.

The auxiliary device driving mechanism 10 of the embodiment includes: the first and second auxiliary device driving shafts 11, 12; the one-way clutch for normal rotation transmission 26 which transmits only the normal rotation of the rotation shaft 3 from the first rotation transmission section 21 to the first auxiliary device driving shaft 11; the one-way clutch for reverse rotation transmission 27 which transmits only the reverse rotation of the rotation shaft 3 from the first rotation transmission section 21 to the second auxiliary device driving shaft 12; and the external gear set 35 having the gears 35a, 35b in meshing engagement, with the gears 35a, 35b being fixed to the first and second auxiliary device driving shafts 11, 12, respectively.

In this structure, the one-way clutch for normal rotation transmission 26 and the one-way clutch for reverse rotation transmission 27 act in a manner such that the first auxiliary device driving shaft 11 is driven into the normal rotation when the motor 4 rotates in the normal direction and that the second auxiliary device driving shaft 12 is driven into the reverse rotation when the motor 4 rotates in the reverse direction. In the external gear set 35 in which the gears 35a, 35b are fixed to the first and the second auxiliary device driving shafts 11, 12, respectively, and externally meshed with each other, the rotation of either one of the first and the second auxiliary device driving shafts 11, 12 is reversed and transmitted to the other driving shaft. These components work together to make each of the first and second auxiliary device driving shafts 11, 12 rotate unidirectionally regardless of the normal rotation or the reverse rotation of the motor 4.

The embodiment is designed such that the first auxiliary device driving shaft 11 and the second auxiliary device driving shaft 12 each can be rotated at desired number of revolutions and torque by properly setting the teeth numbers of the driving sprockets 23, 31 and the driven sprockets 24, 25, 32 of the first and second rotation transmission sections 21, 22 and by properly setting the teeth numbers of the gears 35a, 35b of the external gear set 35. This provides options to use which of the first auxiliary device driving shaft 11 and the second auxiliary device driving shaft 12 to drive each of the in-vehicle auxiliary devices at what number of revolutions. Hence, each of the in-vehicle auxiliary devices can be driven at suitable number of revolutions and torque.

The first and second rotation transmission sections 21, 22 of the auxiliary device driving mechanism 10 of the embodiment are configured to transmit the power by means of the chain 28 looped around the driving sprocket 23 and the driven sprockets 24, 25 and the chain 34 looped around the driving sprocket 31 and the driven sprocket 32. Therefore, the driving mechanism obviates the need for belt tension adjustment and belt replacement which are necessary jobs in a belt-driven mechanism, thus embodying a maintenance-free mechanism.

Second Embodiment

Next, description is made on a second embodiment of the invention. In the description of the second embodiment and the corresponding figures, like reference characters refer to components corresponding or equivalent to those of the first embodiment and a detailed description thereof is dispensed with. The other features than those described as below are the same as in the first embodiment. The same holds for the other embodiments of the invention.

Figure 6:
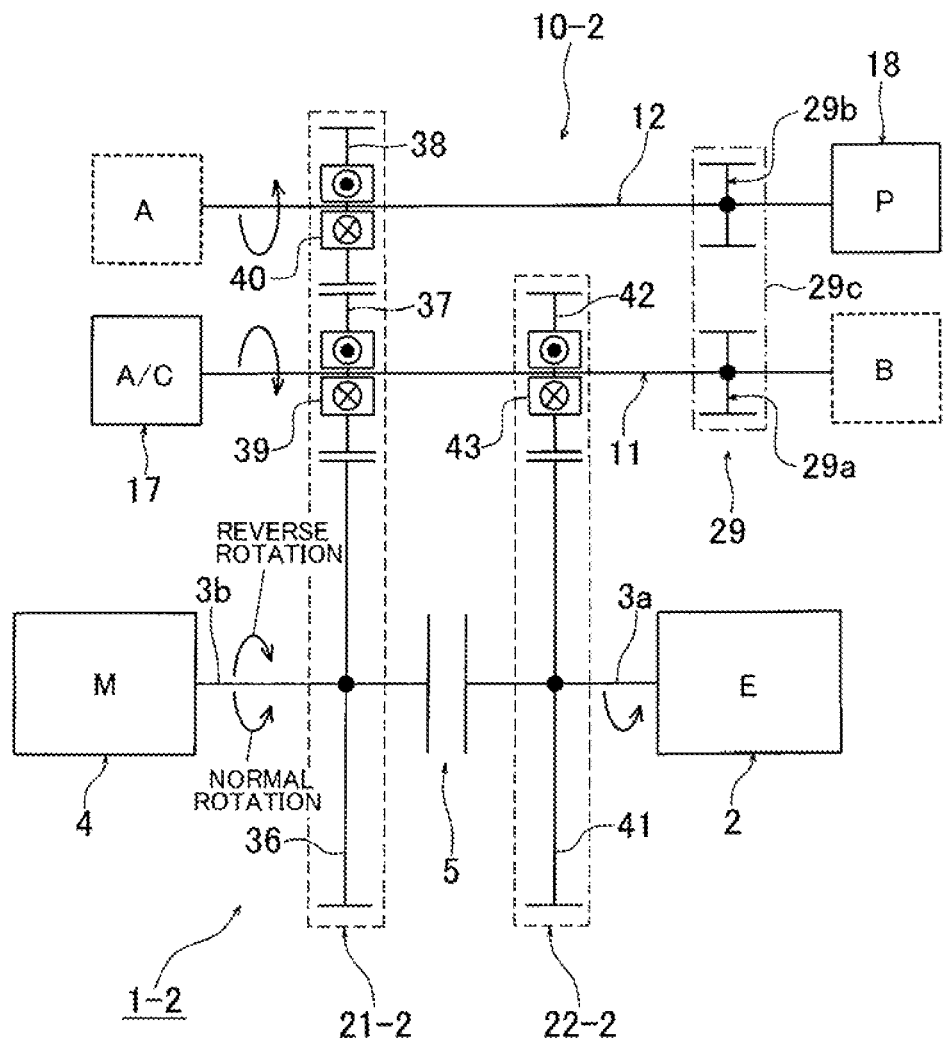
FIG. 6 is a skeleton diagram schematically showing a driving force transmission device for hybrid vehicle according to a second embodiment of the invention.

FIG. 6 is a skeleton diagram schematically showing a driving force transmission device 1-2 according to the second embodiment of the invention. An auxiliary device driving mechanism 10-2 of the driving force transmission device 1-2 according to the embodiment includes a first rotation transmission section 21-2 having a different structure from that of the first rotation transmission section 21 of the auxiliary device driving mechanism 10 of the first embodiment. The first rotation transmission section 21 includes the driving sprocket 23, the first driven sprocket 24, the second driven sprocket 25 and the chain (triple-row chain) 28 looped around these sprockets. The first rotation transmission section 21-2 includes: a driving gear 36 fixed on the motor shaft 3b; a first driven gear 37 mounted on the first auxiliary device driving shaft 11; and a second driven gear 38 mounted on the second auxiliary device driving shaft 12, and has a structure in which the driving gear 36 is meshed with the first driven gear 37 while the first driven gear 37 is meshed with the second driven gear 38. Interposed between the first auxiliary device driving shaft 11 and the first driven gear 37 is a one-way clutch for reverse rotation transmission 39 for transmitting only the reverse rotation of the first driven gear 37 to the first auxiliary device driving shaft 11. Interposed between the second auxiliary device driving shaft 12 and the second driven gear 38 is a one-way clutch for reverse rotation transmission 40 for transmitting only the reverse rotation of the second driven gear 38 to the second auxiliary device driving shaft 12.

The auxiliary device driving mechanism 10-2 of the embodiment includes a rotation transmission section 29 in place of the external gear set 35 of the auxiliary device driving mechanism 10 of the first embodiment. The rotation transmission section 29 serves as the power transmission element between the first auxiliary device driving shaft 11 and the second auxiliary device driving shaft 12, and includes: a sprocket 29a fixed to the first auxiliary device driving shaft 11; a sprocket 29b fixed to the second auxiliary device driving shaft 12; and a chain (double-row chain) 29c looped around these sprockets 29a and 29b. The rotation transmission section 29 is adapted to transmit the rotation (unchanged in direction) of either one of the first auxiliary device driving shaft 11 and the second auxiliary device driving shaft 12 to the other driving shaft.

In the first rotation transmission section 21-2, the normal rotation of the motor shaft 3b and the driving gear 36 brings the first driven gear 37 on the first auxiliary device driving shaft 11 into the reverse rotation while the second driven gear 38 on the second auxiliary device driving shaft 12 is brought into the normal rotation. In this case, the reverse rotation of the first driven gear 37 is transmitted to the first auxiliary device driving shaft 11 via the one-way clutch for reverse rotation transmission 39 so that the first auxiliary device driving shaft 11 rotates in the reverse direction. This rotation is also transmitted to the second auxiliary device driving shaft 12 by the rotation transmission section 29 so that the second auxiliary device driving shaft 12 rotates in the reverse direction.

When the motor shaft 3b and the driving gear 36 rotate in the reverse direction, on the other hand, the first driven gear 37 on the first auxiliary device driving shaft 11 is brought into the normal rotation while the second driven gear 38 on the second auxiliary device driving shaft 12 is brought into the reverse rotation. In this case, the reverse rotation of the second driven gear 38 is transmitted to the second auxiliary device driving shaft 12 via the one-way clutch for reverse rotation transmission 40 so that the second auxiliary device driving shaft 12 rotates in the reverse direction. This rotation is also transmitted to the first auxiliary device driving shaft 11 by the rotation transmission section 29 so that the first auxiliary device driving shaft 11 rotates in the reverse direction.

The auxiliary device driving mechanism 10-2 of this embodiment includes a second rotation transmission section 22-2 having a different structure from that of the second rotation transmission section 22 of the auxiliary device driving mechanism 10 of the first embodiment. The rotation transmission section 22 includes the driving sprocket 31, the driven sprocket 32 and the double-row chain 34 looped around these sprockets. The second rotation transmission section 22-2 includes: a driving gear 41 mounted on the engine shaft 3a and a driven gear 42 mounted on the first auxiliary device driving shaft 11 and has a structure in which the driving gear 41 is meshed with the driven gear 42. Interposed between the first auxiliary device driving shaft 11 and the driven gear 42 is a one-way clutch for reverse rotation transmission 43.

Therefore, the driven gear 42 on the first auxiliary device driving shaft 11 is rotated in the reverse rotation by the normal rotation of the driving gear 41 mounted on the engine shaft 3a. This rotation is transmitted to the first auxiliary device driving shaft 11 via the one-way clutch for reverse rotation transmission 43 so that the first auxiliary device driving shaft 11 rotates in the reverse direction. This rotation is also transmitted to the second auxiliary device driving shaft 12 by the rotation transmission section 29, so that the second auxiliary device driving shaft 12 rotates in the reverse direction. In this embodiment, both the first auxiliary device driving shaft 11 and the second auxiliary device driving shaft 12 rotate in the reverse direction. Therefore, the air compressor 17 and the oil pump 18 may each employ a device drivable by the reverse rotation of the first auxiliary device driving shaft 11 or the second auxiliary device driving shaft 12.

Similarly to the first embodiment, this embodiment is also adapted to rotate the first and second auxiliary device driving shafts 11, 12 unidirectionally regardless of the rotational direction of the input shaft 3 (motor shaft 3b) driven by the engine 2 or the motor 4. Therefore, even in a case where the air compressor 17 and the oil pump 18 are auxiliary devices having directionality of rotation or drivable by unidirectional rotation, these devices can be driven by both the normal and reverse rotations of the motor 4. Further, the auxiliary device driving mechanism 10-2 of the embodiment also embodies a mechanism which utilizes both the normal and reverse rotations of the motor 4 to drive the air compressor 17 or the oil pump 18 into the unidirectional rotation by means of the three one-way clutches 39, 40, 43 disposed between the first and second rotation transmission sections 21-2, 21-2 and the first and second auxiliary device driving shafts 11, 12. Thus is provided the simple structure with the reduced number of components, which is adapted to drive the in-vehicle auxiliary device having the directionality of rotation by utilizing both the normal and reverse rotations of the motor 4.

Third Embodiment

Figure 7:
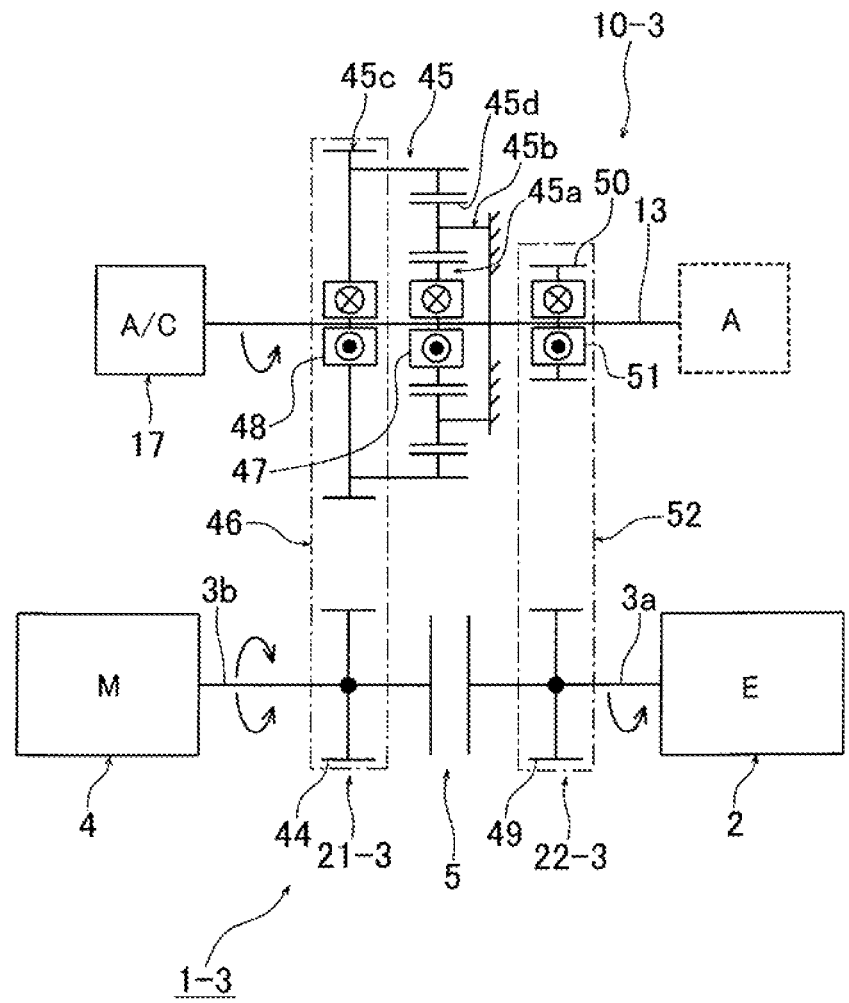
FIG. 7 is a skeleton diagram schematically showing a driving force transmission device for hybrid vehicle according to a third embodiment of the invention.

Next, description is made on a third embodiment of the invention. FIG. 7 is a skeleton diagram schematically showing a driving force transmission device 1-3 according to a third embodiment of the invention. An auxiliary device driving mechanism 10-3 of the driving force transmission device 1-3 according to this embodiment includes: a single auxiliary device driving shaft 13; and a first rotation transmission section 21-3 and a second rotation transmission section 22-3 for transmitting the rotation of the input shaft 3 to the auxiliary device driving shaft 13. The first rotation transmission section 21-3 includes: a driving sprocket 44 mounted on the motor shaft 3b in a manner incapable of relative rotation; a planetary gear mechanism 45 mounted on the auxiliary device driving shaft 13; and a driving force transmission chain (double-row chain) 46 looped around these driving sprocket 44 and planetary gear mechanism 45. The planetary gear mechanism 45 includes: a sun gear 45a mounted on the auxiliary device driving shaft 13 via a one-way clutch for normal rotation transmission 47; a carrier 45b fixed to a stationary side; and a ring gear 45c mounted on the auxiliary device driving shaft 13 via a one-way clutch for normal rotation transmission 48. Mounted on the carrier 45b is a pinion gear 45d meshed with the sun gear 45a and the ring gear 45c. The chain 46 is looped around the driving sprocket 44 and the ring gear 46 of the planetary gear mechanism 45.

The second rotation transmission section 22-3 includes: a driving sprocket 49 mounted on the engine shaft 3a in a manner incapable of relative rotation; a driven sprocket 50 mounted on the auxiliary device driving shaft 13 via a one-way clutch for normal rotation transmission 51; and a driving force transmission chain (double-row chain) 52 looped around the driving sprocket 49 and the driven sprocket 50.

In the auxiliary device driving mechanism 10-3 having the above structure, the normal rotation of the motor 4 brings the driving sprocket 44 of the first rotation transmission section 21-3 into the normal rotation. Then, the rotation of the driving sprocket 44 is transmitted to the ring gear 45c of the planetary gear mechanism 45 via the chain 46 so that the ring gear 45c rotates in the normal direction. The rotation of the ring gear 45c is transmitted to the auxiliary device driving shaft 13 by means of the one-way clutch for normal rotation transmission 48 so that the auxiliary device driving shaft 13 rotates in the normal direction. Thus is driven the air compressor 17 mounted on the auxiliary device driving shaft 13. At this time, the sun gear 45a of the planetary gear mechanism 45 rotates in the reverse direction. However, the one-way clutch for normal rotation transmission 47 disposed between the auxiliary device driving shaft 13 and the sun gear 45a makes the idle rotation so that the reverse rotation of the sun gear 45a is not transmitted to the auxiliary device driving shaft 13.

On the other hand, the reverse rotation of the motor 4 brings the driving sprocket 44 of the first rotation transmission section 21-3 into the reverse rotation. Then, the rotation of the driving sprocket 44 is transmitted to the ring gear 45c of the planetary gear mechanism 45 via the chain 46 so that the ring gear 45c rotates in the reverse direction. The rotation of the ring gear 45c is transmitted to the sun gear 45a via the pinion gear 45d so that the sun gear 45a rotates in the normal direction. Then, the rotation of the sun gear 45a is transmitted to the auxiliary device driving shaft 13 by means of the one-way clutch for normal rotation transmission 47 so that the auxiliary device driving shaft 13 rotates in the normal direction. Thus is driven the air compressor 17 mounted on the auxiliary device driving shaft 13. At this time, the ring gear 45c of the planetary gear mechanism 45 rotates in the reverse direction.

However, the one-way clutch for normal rotation transmission 48 disposed between the auxiliary device driving shaft 13 and the ring gear 45c makes the idle rotation so that the reverse rotation of the ring gear 45c is not transmitted to the auxiliary device driving shaft 13.

Similarly to the first and second embodiments, this embodiment is also adapted to rotate the first and second auxiliary device driving shafts 11, 12 unidirectionally regardless of the rotational direction of the input shaft 3 (motor shaft 3b) driven by the engine 2 or the motor 4. Therefore, the in-vehicle auxiliary device having the directionality of rotation, such as the air compressor 17, can be driven by both the normal and reverse rotations of the motor 4. The auxiliary device driving mechanism 10-3 of the embodiment employs the planetary gear mechanism 45 in the first rotation transmission section 21-3 whereby the mechanism that is drivable to rotate unidirectionally by both the normal and reverse rotations of the motor 4 is embodied by using the auxiliary device driving shaft 13 alone.

Fourth Embodiment

Figure 8:
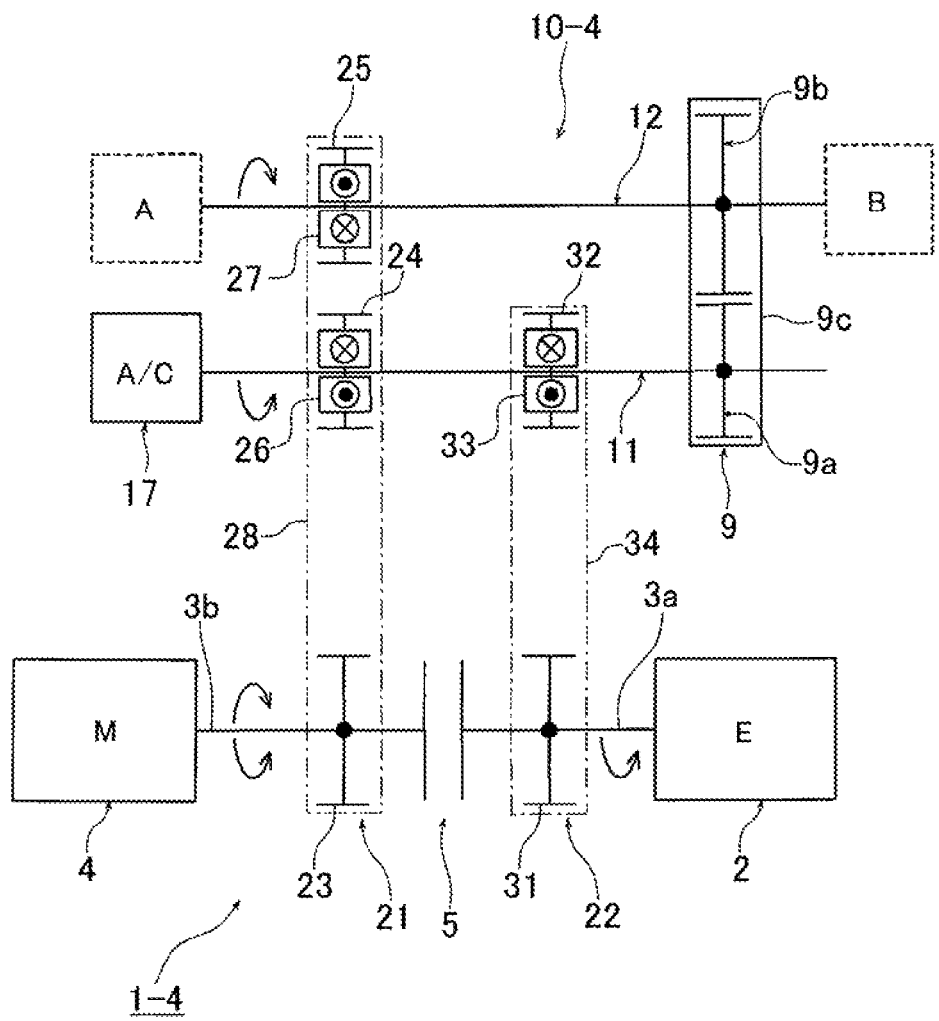
FIG. 8 is a skeleton diagram schematically showing a driving force transmission device for hybrid vehicle according to a fourth embodiment of the invention.

Next, description is made on a fourth embodiment of the invention. FIG. 8 is a skeleton diagram schematically showing a driving force transmission device 1-4 according to the fourth embodiment of the invention. An auxiliary device driving mechanism 10-4 of the driving force transmission device 1-4 of the embodiment includes an external-gear oil pump 9 disposed between the first auxiliary device driving shaft 11 and the second auxiliary device driving shaft 12 in place of the external gear set 35 and the oil pump 18 of the auxiliary device driving mechanism 10 of the first embodiment. Except for this, the embodiment is constructed the same way as the auxiliary device driving mechanism 10 of the first embodiment.

The external-gear oil pump 9, the details of which are not shown in the figure, includes a pump casing 9c in which an externally meshing pump gear 9a fixed to the first auxiliary device driving shaft 11 is meshed with an externally meshing pump gear 9b fixed to the second auxiliary device driving shaft 12. The external-gear oil pump 9 is adapted to draw/discharge oil into/from the pump casing 9c by rotating these externally meshing pump gears 9a, 9b.

In the external-gear oil pump 9, a driving pump gear is switched between these pump gears depending on whether the motor 4 makes the reverse rotation or the normal rotation. Therefore, the oil pump 9 is adapted to rotate unidirectionally whether the motor 4 makes the normal rotation or the reverse rotation. In this manner, the external-gear oil pump 9 as the in-vehicle auxiliary device is adapted to function as a rotational direction converting element and a power transmission element between the first auxiliary device driving shaft 11 and the second auxiliary device driving shaft 12. Since the oil pump 9 also serves as the external gear set for converting the rotational direction, the auxiliary device driving mechanism 10-4 can be reduced in the number of components, achieving structure simplification, weight reduction and cost reduction.

Fifth Embodiment

Figure 9:
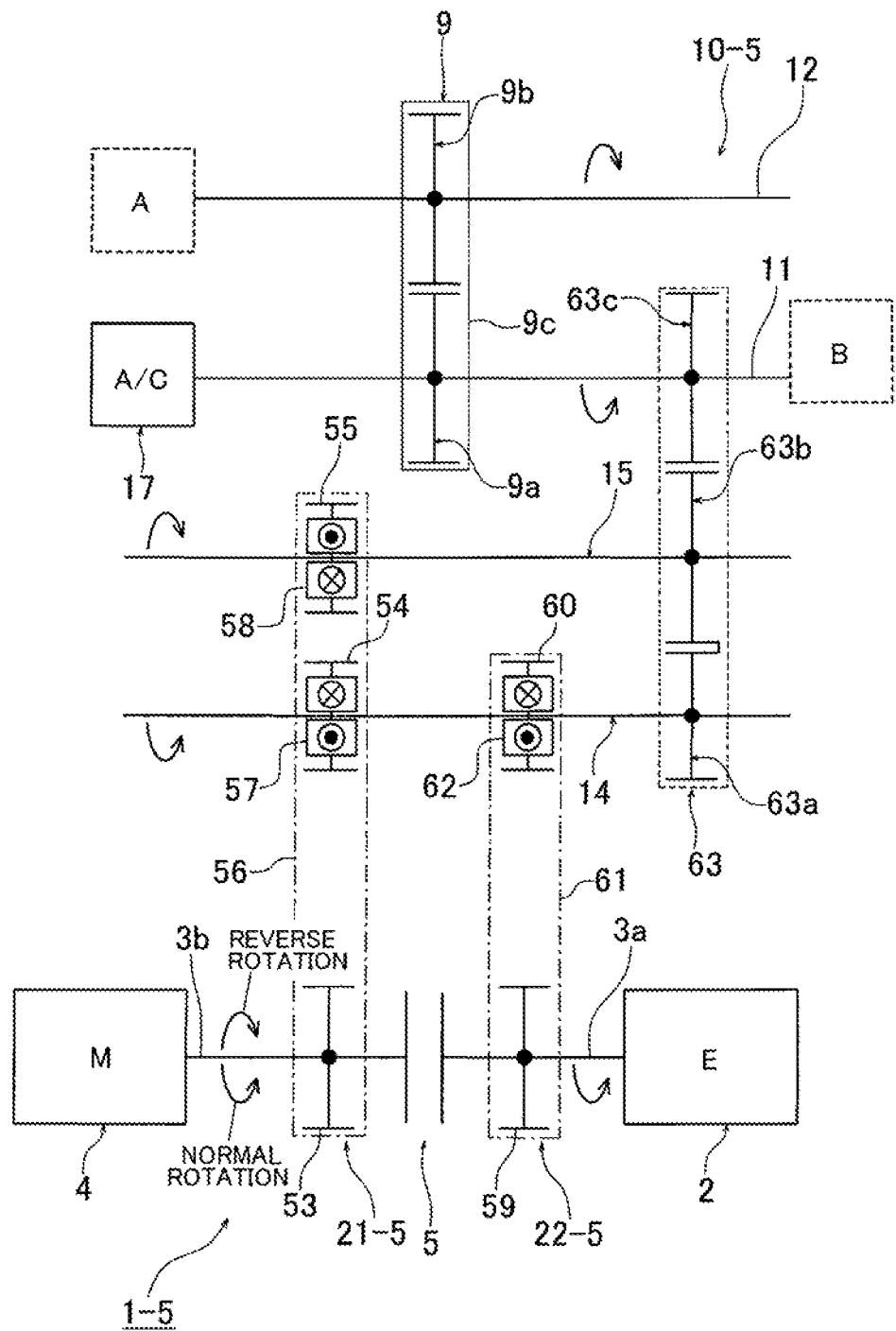
FIG. 9 is a skeleton diagram schematically showing a driving force transmission device for hybrid vehicle according to a fifth embodiment of the invention.

Next, description is made on a fifth embodiment of the invention. FIG. 9 is a skeleton diagram schematically showing a driving force transmission device 1-5 according to the fifth embodiment of the invention. In addition to the components constructing the auxiliary device driving mechanism 10 of the first embodiment, an auxiliary device driving mechanism 10-5 of the driving force transmission device 1-5 of the embodiment further includes first and second intermediate shafts 14, 15 disposed between the input shaft 3 (engine shaft 3a and motor shaft 3b) and the first and second auxiliary device driving shafts 11, 12. Therefore, the rotation of the input shaft 3 is first transmitted to the first and second intermediate shafts 14, 15, from which the rotation is transmitted to the first and second auxiliary device driving shafts 11, 12.

The auxiliary device driving mechanism 10-5 of the embodiment further includes a first rotation transmission section 21-5 and a second rotation transmission section 22-5 for transmitting the rotation of the input shaft 3 to the first and second intermediate shafts 14, 15. The first rotation transmission section 21-5 includes: a driving sprocket 53 mounted on the motor shaft 3b; a first driven sprocket 54 mounted on the first intermediate shaft 14; a second driven sprocket 55 mounted on the second intermediate shaft 15; and a chain (triple-row chain) 56 looped around these three sprockets. Interposed between the first intermediate shaft 14 and the first driven sprocket 54 is a one-way clutch for normal rotation transmission 57, while a one-way clutch for reverse rotation transmission 58 is interposed between the second intermediate shaft 15 and the second driven sprocket 55. The second rotation transmission section 22-5 includes: a driving sprocket 59 fixed on the engine shaft 3a; a driven sprocket 60 fixed on the first intermediate shaft 14; and a chain (double-row chain) 61 looped around the driving sprocket 59 and the driven sprocket 60. Interposed between the first intermediate shaft 14 and the driven sprocket 60 is a one-way clutch for normal rotation transmission 62.

Further, a triple external gear set 63 is mounted on the first and second intermediate shafts 14, 15 and the first auxiliary device driving shaft 11. The triple external gear set 63 has a structure in which an externally meshing gear 63b fixed to the second intermediate shaft 15 is meshed with both an externally meshing gear 63a fixed to the first intermediate shaft 14 and an externally meshing gear 63c fixed to the first auxiliary device driving shaft 11. The auxiliary device driving mechanism 10-5 further includes the external-gear oil pump 9 disposed between the first auxiliary device driving shaft 11 and the second auxiliary device driving shaft 12. The external-gear oil pump 9 has a structure in which the externally meshing pump gear 9a fixed to the first auxiliary device driving shaft 11 is meshed with the externally meshing pump gear 9b fixed to the second auxiliary device driving shaft 12.

Figure 10:
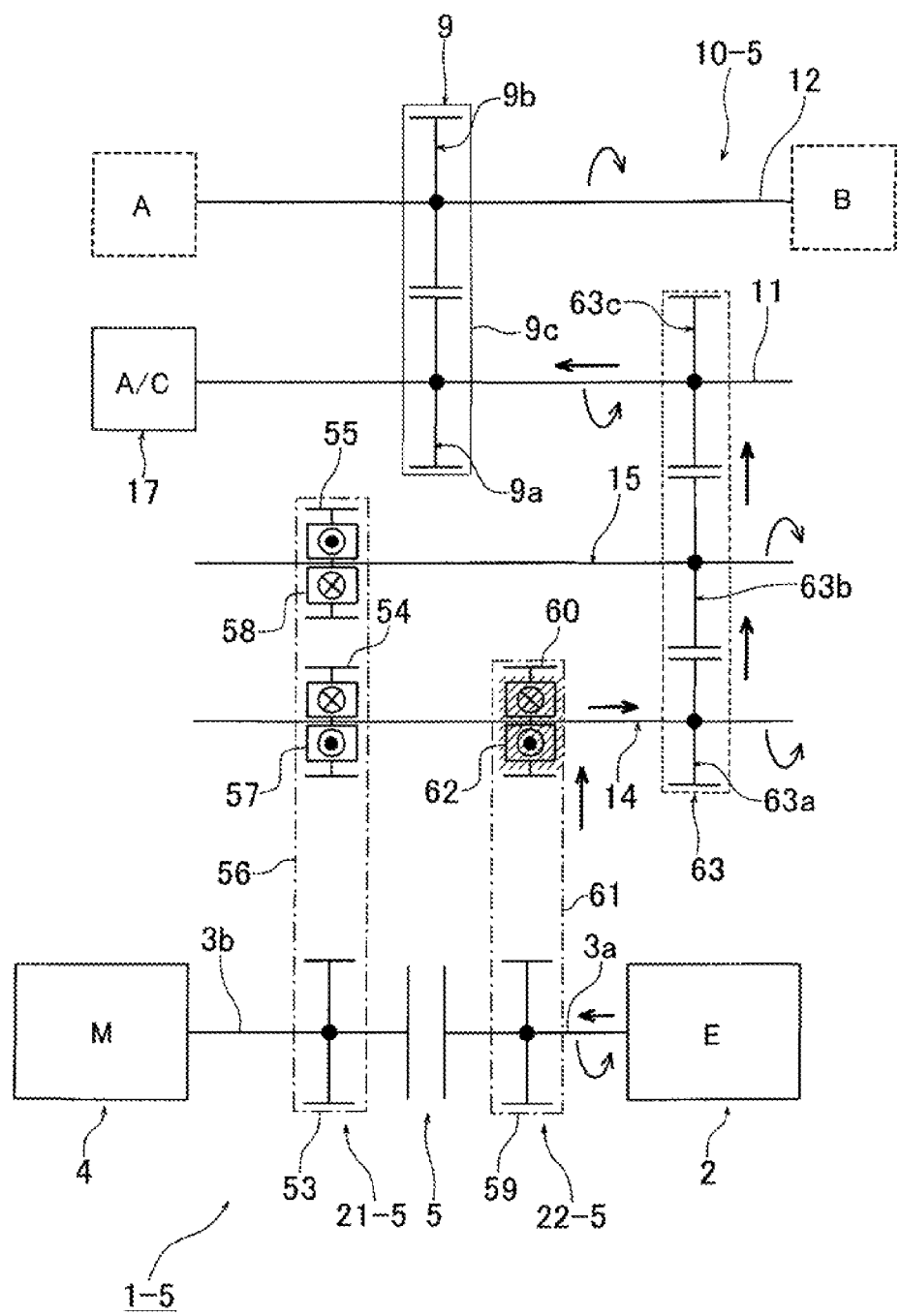
FIG. 10 is a diagram illustrating an operation of an auxiliary device driving mechanism according to the fifth embodiment, namely a skeleton diagram schematically showing a driving force transmission path.
Figure 11:
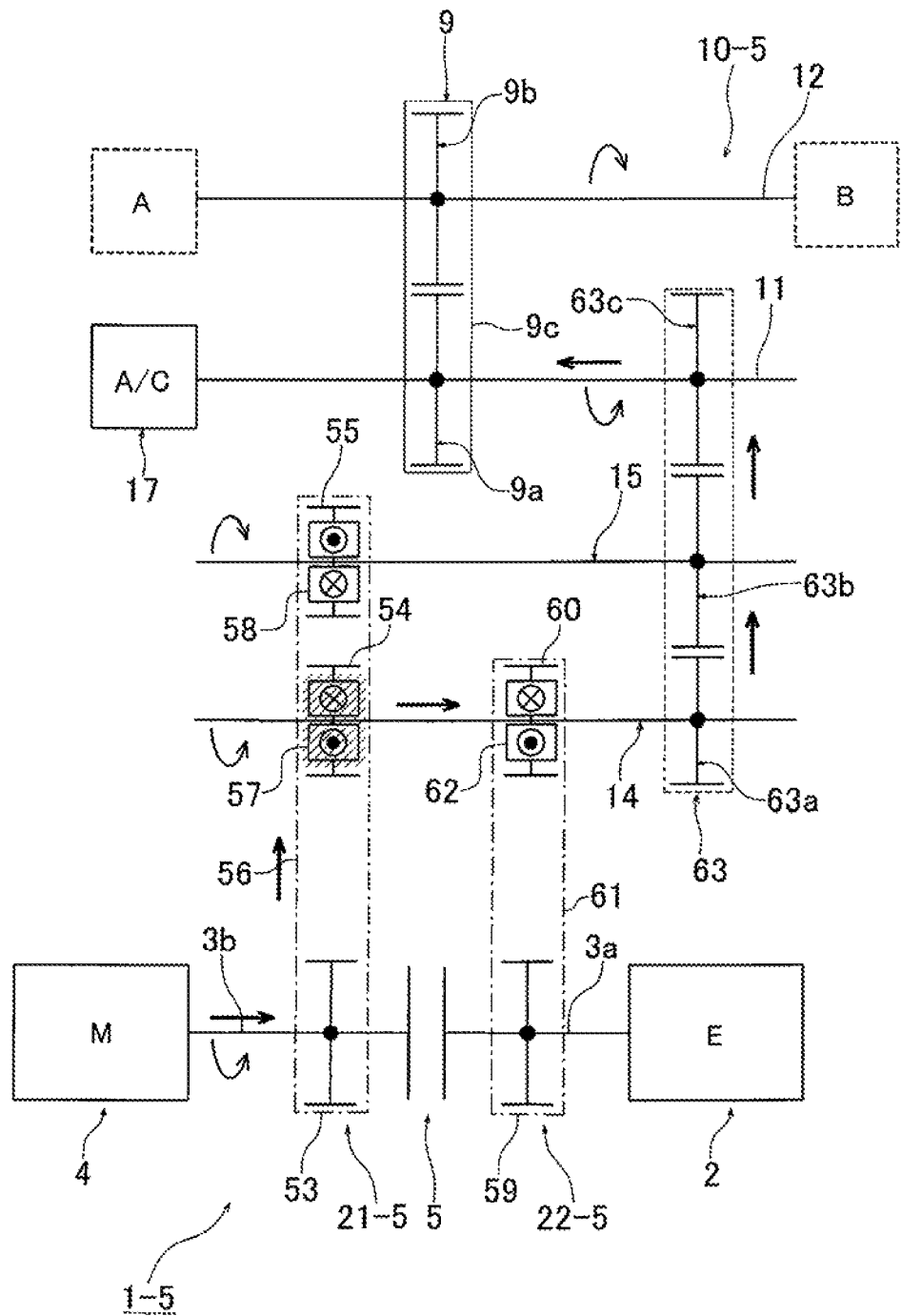
FIG. 11 is a diagram illustrating the operation of the auxiliary device driving mechanism according to the fifth embodiment, namely a skeleton diagram schematically showing a driving force transmission path.
Figure 12:
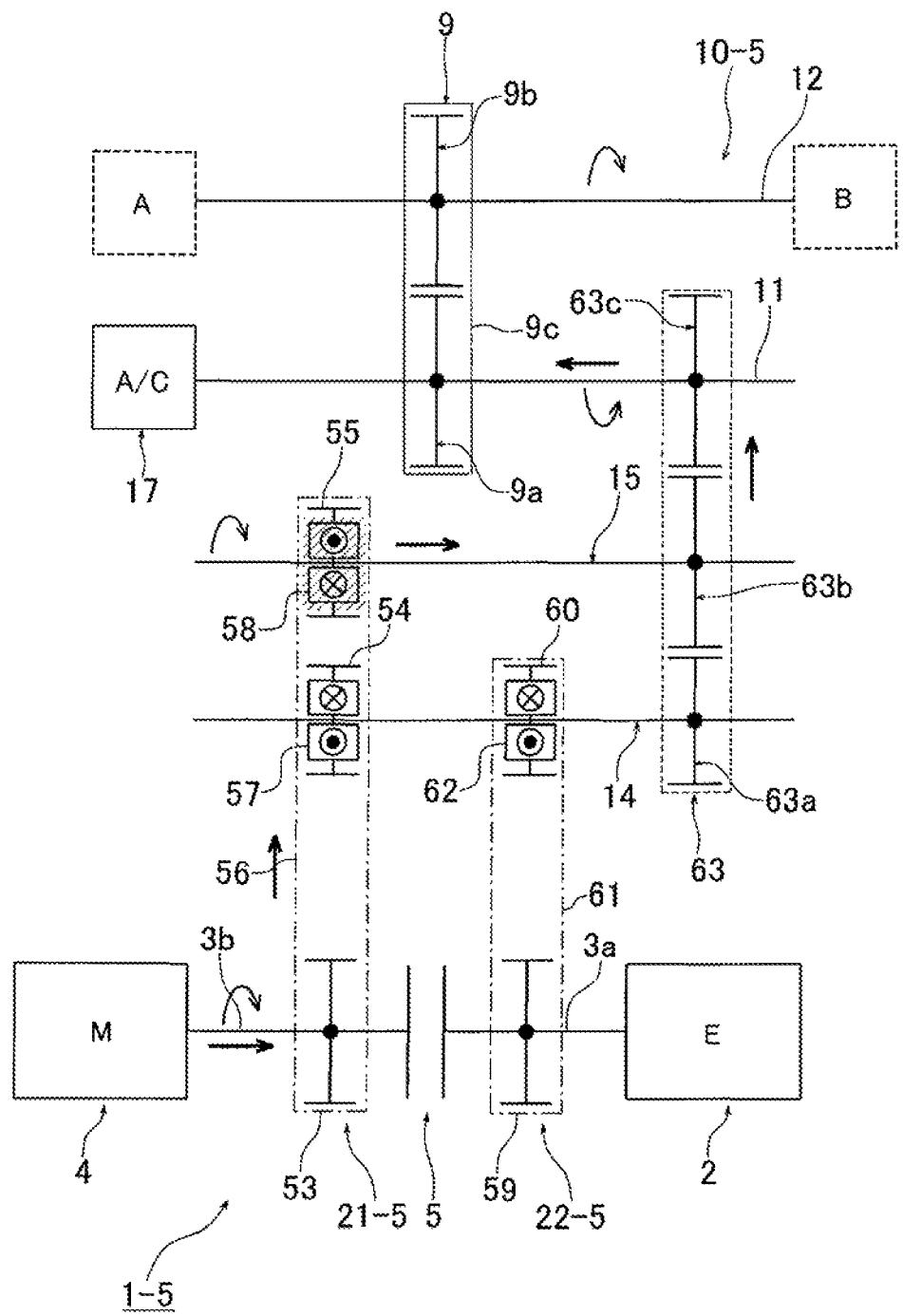
FIG. 12 is a diagram illustrating the operation of the auxiliary device driving mechanism according to the fifth embodiment or a skeleton diagram schematically showing a driving force transmission path.

FIG. 10 to FIG. 12 are skeleton diagrams of driving force transmission paths for illustrating the operation of the auxiliary device driving mechanism 10-5. FIG. 10 is a diagram illustrating how the driving force of the engine 2 is transmitted to the first auxiliary device driving shaft 11 and the second auxiliary device driving shaft 12. In this case, the driving force of the engine 2 rotates the driving sprocket 59 in the normal direction. The rotation of the driving sprocket 59 is transmitted to the driven sprocket 60 via the chain 61 so that the driven sprocket 60 rotates in the normal direction. The rotation of the driven sprocket 60 is transmitted to the first intermediate shaft 14 by means of the one-way clutch for normal rotation 62 so that the first intermediate shaft 14 rotates in the normal direction. This rotation is further transmitted to the first auxiliary device driving shaft 11 by means of the triple external gear set 63. Thus is driven the air compressor 17 mounted on the first auxiliary device driving shaft 11. On the other hand, the rotation of the first auxiliary device driving shaft 11 is reversed and transmitted to second auxiliary device driving shaft 12 by means of the external-gear oil pump 9. Thus, the second auxiliary device driving shaft 12 is rotated in the reverse direction.

FIG. 11 is a diagram illustrating how the driving force derived by the normal rotation of the motor 4 is transmitted to the first auxiliary device driving shaft 11 and the second auxiliary device driving shaft 12. In this case, the normal rotation of the motor 4 brings the driving sprocket 53 into the normal rotation. The rotation of the driving sprocket 53 is transmitted to the first driven sprocket 54 via the chain 56 so that the first driven sprocket 54 rotates in the normal direction. The rotation of the first driven sprocket 54 is transmitted to the first intermediate shaft 14 by means of the one-way clutch for normal rotation transmission 57 so that the first intermediate shaft 14 rotates in the normal direction. This rotation is further transmitted to the first auxiliary device driving shaft 11 by means of the triple external gear set 63. Thus is driven the air compressor 17 mounted to the first auxiliary device driving shaft 11. Further, the rotation of the first auxiliary device driving shaft 11 is reversed and transmitted to the second auxiliary device driving shaft 12 by means of the external-gear oil pump 9. Thus, the second auxiliary device driving shaft 12 is rotated in the reverse direction.

FIG. 12 is a diagram illustrating how the driving force derived by the reverse rotation of the motor 4 is transmitted to the first auxiliary device driving shaft 11 and the second auxiliary device driving shaft 12. In this case, the motor 4 is made to rotate in the reverse direction with the clutch 5 disengaged, and the reverse rotation of the motor 4 brings the driving sprocket 53 into the reverse rotation. The rotation of the driving sprocket 53 is transmitted to the second driven sprocket 55 by means of the chain 56 so that the second driven sprocket 55 rotates in the reverse direction. The rotation of the second driven sprocket 55 is transmitted to the second intermediate shaft 15 by means of the one-way clutch for reverse rotation transmission 58 so that the second intermediate shaft 15 rotates in the reverse direction. This rotation is further transmitted to the first auxiliary device driving shaft 11 by means of the triple external gear set 63. Thus is driven the air compressor 17 mounted to the first auxiliary device driving shaft 11. On the other hand, the rotation of the first auxiliary device driving shaft 11 is reversed and transmitted to the second auxiliary device driving shaft 12 by means of the external-gear oil pump 9. Thus, the second auxiliary device driving shaft 12 is rotated in the reverse direction.

Figure 13:
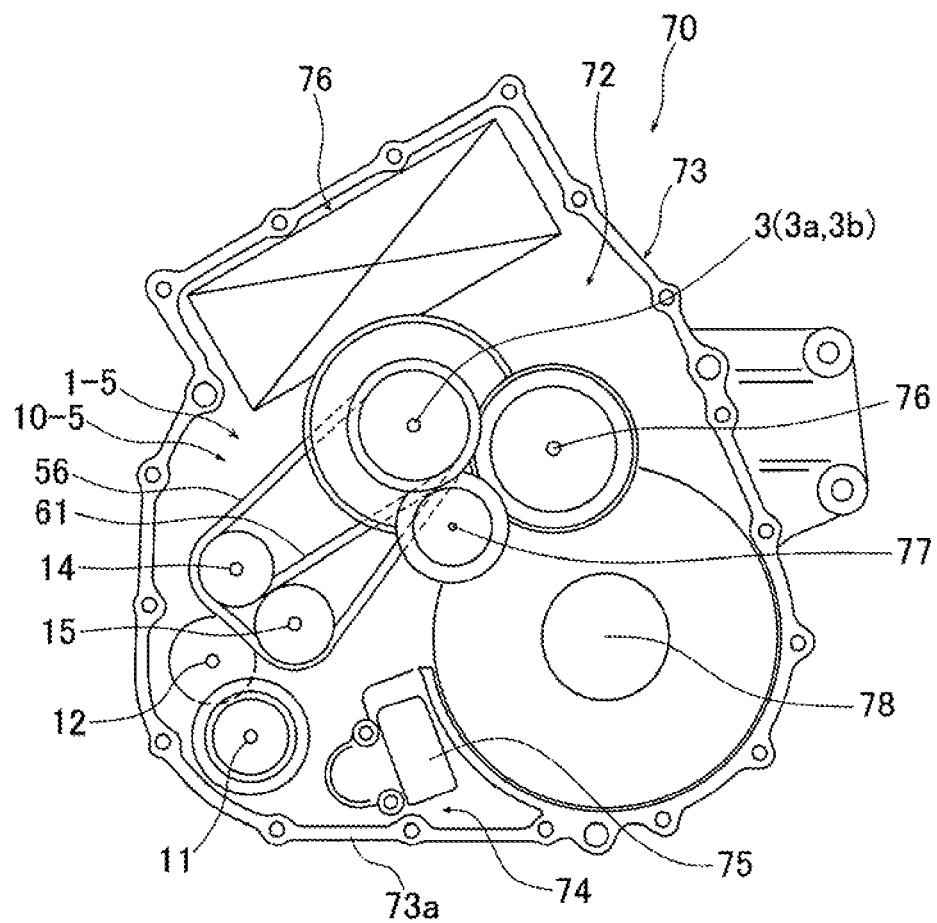
FIG. 13 is a diagram showing an internal configuration of a gearbox of the driving force transmission device according to the fifth embodiment.

FIG. 13 is a schematic sectional side view showing a gearbox 70 equipped with the driving force transmission device 1-5 of the embodiment. Referring to the figure, description is made on an internal configuration of the driving force transmission device 1-5 in the gearbox 70. The first auxiliary device driving shaft 11 and the second auxiliary device driving shaft 12 of the auxiliary device driving mechanism 10-5 of the embodiment are disposed in the casing 73 of the gearbox 70 and located diagonally downward from the input shaft 3. The auxiliary device driving shafts 11, 12 are arranged side by side in the vicinity of the bottom wall 73a of the casing 73. The first and second intermediate shafts 14, 15 are disposed upwardly of the first auxiliary device driving shaft 11 and the second auxiliary device driving shaft 12 and disposed between these auxiliary device driving shafts 11, 12 and the input shaft 3. These first and second intermediate shafts 14, 15 are spaced upward from the bottom wall 73a of the casing 73 and located at higher places than the first auxiliary device driving shaft 11 and the second auxiliary device driving shaft 12. Therefore, the double-row chain 61 and the triple-row chain 56 looped around the input shaft 3 and the first and the second intermediate shafts 14, 15 are located at high places spaced away from the bottom wall 73a of the casing 73.

Figure 14A:
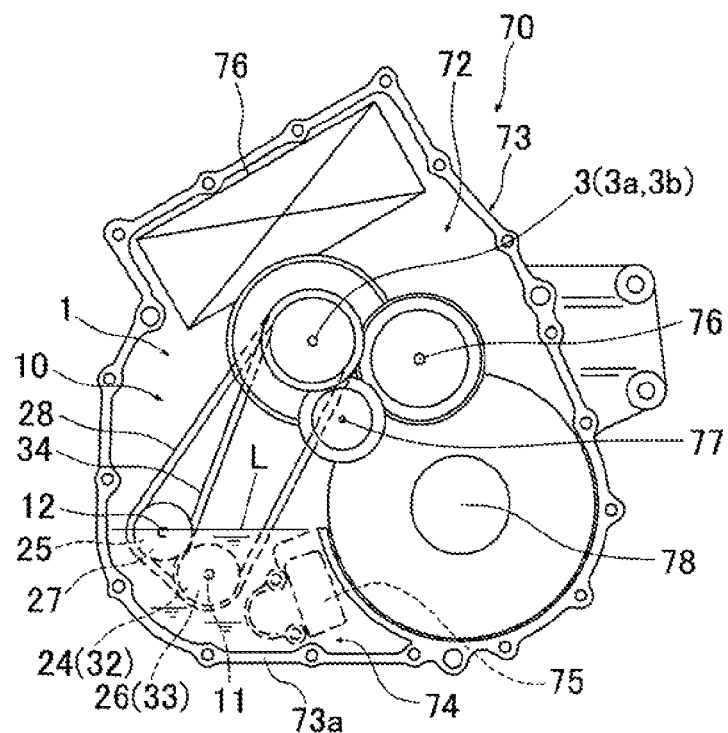
FIG. 14 diagrammatically illustrates an oil level in the gearbox equipped with the driving force transmission device, and includes a diagram of FIG. 14A showing the gearbox equipped with the driving force transmission device of the first embodiment and a diagram of FIG. 14B showing the gearbox equipped with the driving force transmission device of the fifth embodiment.
Figure 14B:
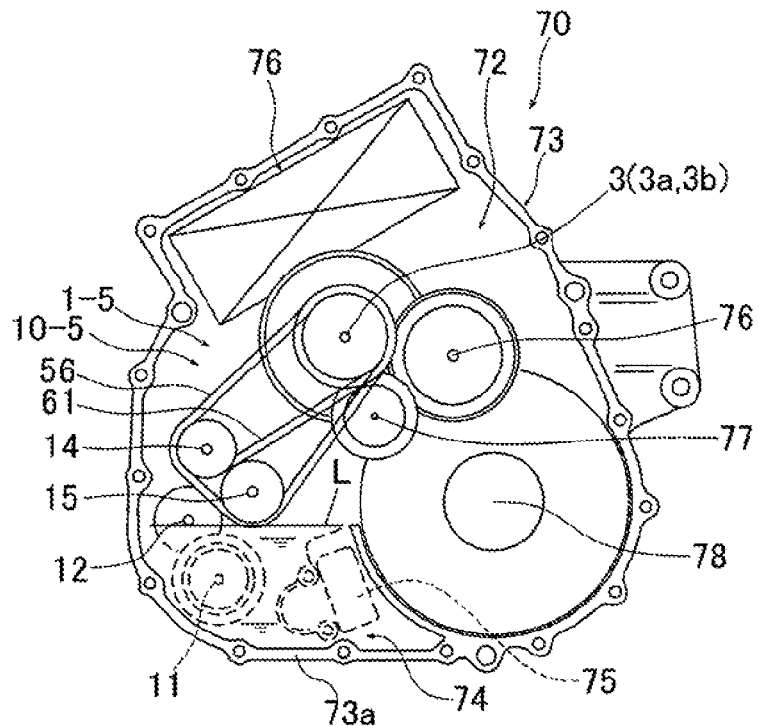

FIG. 14 diagrammatically illustrates an oil level in the gearbox 70. FIG. 14A is a diagram showing the gearbox 70 equipped with the auxiliary device driving mechanism 10 of the first embodiment. FIG. 14B is a diagram showing the gearbox 70 equipped with the auxiliary device driving mechanism 10-5 of the fifth embodiment. In the gearbox 70 equipped with the auxiliary device driving mechanism 10 of the first embodiment shown in FIG. 14A, lower ends of the chains 28, 34 looped around the input shaft 3 and the first and second auxiliary device driving shafts 11, 12 are located at places below an oil level 'L' of the oil pool 74 in the casing 73. Accordingly, the chains 28, 34 are partially submerged in the oil of the oil pool 74. Hence, the oil is prone to agitation caused by the rotation of the chains 28, 34. The oil containing bubbles caused by the agitation by the rotating chains 28, 34 flows into an inlet port (not shown) of the oil strainer 75. This oil flow may induce aeration. There is also a fear that the chains 28, 34 and the input shaft 3 performing the revolving motion may encounter increased friction.

In the gearbox 70 equipped with the auxiliary device driving mechanism 10-5 of this embodiment shown in FIG. 14B, on the other hand, the first and second intermediate shafts 14, 15 are provided so as to locate the auxiliary device driving chains 56, 61 at places above the oil level 'L' of the oil pool 74. This prevents the agitation of the oil caused by the rotating chains 56, 61. This also leads to the prevention of aeration. Furthermore, the chains 56, 61 are also prevented from encountering the increase in friction while performing the revolving motion.

The auxiliary device driving mechanism 10-5 of the embodiment is notably increased in freedom in shaft layout by virtue of the first and second intermediate shafts 14, 15 interposed between the rotation shaft 3 and the first and second auxiliary device driving shafts 11, 12. Accordingly, the locations of the shafts or the power transmission elements can be changed at will, so that the configuration as shown in FIG. 14B can be implemented to prevent the auxiliary device driving chains 56, 61 from being submerged in the oil of the oil pool 74. Thus are obtained aeration prevention effect and friction reduction effect. Furthermore, the increased freedom permits the in-vehicle auxiliary devices such as the air compressor 17 and the oil pump 18 to be located at desired places in the casing 73 of the gearbox 70, the illustration of which is dispensed with.

The auxiliary device driving mechanism 10-5 of the embodiment is increased in the number of shafts by adding the first and second intermediate shafts 14, 15, thereby achieving increased freedom of gear ratio between the first and second auxiliary device driving shafts 11, 12. This provides ability to drive the in-vehicle auxiliary devices such as the air compressor 17 and the oil pump 18 at desired numbers of revolutions and toques.

The external-gear oil pump 9 may be provided as a single unit, as shown in FIG. 12. Otherwise, the external-gear oil pump may be formed by using some of the gears 63a to 63c of the triple external gear set 63, so that the external-gear oil pump may share some components with the triple external gear set 63. Further, the external-gear oil pump 9 may be replaced by an external gear set having no pumping function, the illustration of which is dispensed with.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof.

For example, the in-vehicle auxiliary devices driven by the auxiliary device driving mechanism of the driving force transmission device according to the invention are not limited to the air compressor 17 and the oil pump 18 illustrated by the foregoing embodiments but may include other types of in-vehicle auxiliary devices. The specific configurations of the rotation shaft 3, clutch 5 and gearshift mechanism 7 of the driving force transmission devices 1 to 1-5 are suggested by way of example only and hence, other configurations than those of the foregoing embodiments may be adopted. The foregoing embodiments illustrate the case where the clutch 5 is disposed between the first rotation transmission section 21 and the second rotation transmission section 22 mounted on the rotation shaft 3 and where the gearshift mechanism 7 is disposed between first rotation transmission section 21 on the rotation shaft 3 and the motor 4. However, these components may also be arranged in other configurations.

The invention claimed is:

1. A driving force transmission device for hybrid vehicle which comprises:
   an engine;
   a rotation shaft for transmitting a rotational driving force to driving wheels;
   a motor for driving the rotation shaft; and
   a connection/disconnection switching device for switching between connection and disconnection of the driving force from the engine to the driving wheels, further comprising an auxiliary device driving mechanism at least comprising:
   a first auxiliary device driving shaft and a second auxiliary device driving shaft for transmitting the driving force to an in-vehicle auxiliary device;
   a first rotation transmission section for transmitting at least either one of the driving force of the engine and the driving force of the motor to the first auxiliary device driving shaft and the second auxiliary device driving shaft via the rotation shaft;
   a first one-way clutch mounted on the first auxiliary device driving shaft and transmitting only either one of the normal rotation and the reverse rotation of the rotation shaft from the first rotation transmission section to the first auxiliary device driving shaft;
   a second one-way clutch mounted on the second auxiliary device driving shaft and transmitting only the other one of the normal rotation and the reverse rotation of the rotation shaft from the first rotation transmission section to the second auxiliary device driving shaft; and
   a power transmission element for power transmission between the first auxiliary device driving shaft and the second auxiliary device driving shaft,
   wherein the auxiliary device driving mechanism is configured to rotate the first and second auxiliary device driving shafts unidirectionally in both cases where the rotation shaft is rotated in the normal rotation by the rotation of the engine or the normal rotation of the motor and where the rotation shaft is rotated in the reverse rotation by the reverse rotation of the motor.

2. The driving force transmission device for hybrid vehicle according to claim 1, wherein the first one-way clutch transmits only the normal rotation of the rotation shaft from the first rotation transmission section to the first auxiliary device driving shaft,
   wherein the second one-way clutch transmits only the reverse rotation of the rotation shaft from the first rotation transmission section to the second auxiliary device driving shaft, and
   wherein the power transmission element is an external gear set comprising a gear fixed to the first auxiliary device driving shaft and a gear fixed to the second auxiliary device driving shaft, the gears meshing with each other.

3. The driving force transmission device for hybrid vehicle according to claim 2, wherein the auxiliary device driving mechanism further comprises:
   a second rotation transmission section for transmitting the rotation of the rotation shaft to the first auxiliary device driving shaft; and
   a third one-way clutch for transmitting only the normal rotation of the rotation shaft from the second rotation transmission section to the first auxiliary device driving shaft.

4. The driving force transmission device for hybrid vehicle according to claim 3, wherein the first rotation transmission section comprises: a driving sprocket mounted on the rotation shaft; a first driven sprocket mounted on the first auxiliary device driving shaft; a second driven sprocket mounted on the second auxiliary device driving shaft; and a chain looped around the driving sprocket, the first driven sprocket and the second driven sprocket, and
   wherein the second rotation transmission section comprises: another driving sprocket mounted on the rotation shaft; another driven sprocket mounted on the first auxiliary device driving shaft; and a chain looped around these driving sprocket and driven sprocket.

5. The driving force transmission device for hybrid vehicle according to claim 4, wherein at least either one of the first and second auxiliary device driving shafts is configured to rotate at desired number of revolutions and torque by setting a predetermined relation between teeth numbers of the sprockets of the first and second rotation transmission sections and teeth numbers of the gears of the external gear set.

6. The driving force transmission device for hybrid vehicle according to claim 2, wherein the external gear set is replaced by an external-gear oil pump as the in-vehicle auxiliary device, the oil pump comprising pump gears which are fixed to the first and second auxiliary device driving shafts, respectively, and meshed with each other.

7. The driving force transmission device for hybrid vehicle according to claim 6, wherein at least either one of the first and second auxiliary device driving shafts is configured to rotate at desired number of revolutions and torque by setting a predetermined relation between teeth numbers of sprockets of the first and second rotation transmission sections and teeth numbers of the gears of the external-gear oil pump.

8. The driving force transmission device for hybrid vehicle according to claim 3, wherein the external gear set is replaced by an external-gear oil pump as the in-vehicle auxiliary device, the oil pump comprising pump gears which are fixed to the first and second auxiliary device driving shafts, respectively, and meshed with each other.

9. The driving force transmission device for hybrid vehicle according to claim 4, wherein the external gear set is replaced by an external-gear oil pump as the in-vehicle auxiliary device, the oil pump comprising pump gears which are fixed to the first and second auxiliary device driving shafts, respectively, and meshed with each other.

* * * * *